(12) United States Patent
Kennedy et al.

(10) Patent No.: US 10,379,545 B2
(45) Date of Patent: Aug. 13, 2019

(54) DETECTING OPTICAL DISCREPANCIES IN CAPTURED IMAGES

(71) Applicant: Skydio, Inc., Redwood City, CA (US)

(72) Inventors: Ryan Kennedy, Redwood City, CA (US); Peter Henry, Redwood City, CA (US); Abraham Bachrach, Redwood City, CA (US)

(73) Assignee: Skydio, Inc., Redwood City, CA (US)

( * ) Notice: Subject to any disclaimer, the term of this patent is extended or adjusted under 35 U.S.C. 154(b) by 185 days.

(21) Appl. No.: 15/641,021

(22) Filed: Jul. 3, 2017

(65) Prior Publication Data

US 2019/0004543 A1 Jan. 3, 2019

(51) Int. Cl.
| | | |
|---|---|---|
| *B64C 39/02* | (2006.01) | |
| *B64D 47/08* | (2006.01) | |
| *G05D 1/10* | (2006.01) | |
| *G06K 9/00* | (2006.01) | |
| *G06T 5/00* | (2006.01) | |
| *G06T 7/11* | (2017.01) | |
| *H04N 17/00* | (2006.01) | |
| *H04N 5/232* | (2006.01) | |
| *H04N 5/247* | (2006.01) | |

(52) U.S. Cl.
CPC ........... *G05D 1/101* (2013.01); *B64C 39/024* (2013.01); *B64D 47/08* (2013.01); *G06K 9/0063* (2013.01); *G06T 5/002* (2013.01); *G06T 7/11* (2017.01); *H04N 5/23296* (2013.01); *H04N 5/247* (2013.01); *H04N 17/002* (2013.01); *B64C 2201/141* (2013.01)

(58) Field of Classification Search
None
See application file for complete search history.

(56) References Cited

U.S. PATENT DOCUMENTS

| | | | | |
|---|---|---|---|---|
| 8,073,196 | B2 * | 12/2011 | Yuan ........................ | G06K 9/32 |
| | | | | 348/169 |
| 8,879,871 | B2 * | 11/2014 | Vadon ..................... | G06T 17/05 |
| | | | | 345/629 |
| 9,623,905 | B2 * | 4/2017 | Shashua .................. | G01C 21/32 |
| 9,679,227 | B2 * | 6/2017 | Taylor ..................... | G01C 11/06 |
| 9,903,719 | B2 * | 2/2018 | Hunter, Jr. ................ | G06T 7/74 |
| 2007/0286526 | A1 * | 12/2007 | Abousleman ......... | G06K 9/4671 |
| | | | | 382/284 |
| 2012/0050525 | A1 * | 3/2012 | Rinner ...................... | G06T 7/33 |
| | | | | 348/117 |
| 2015/0370250 | A1 * | 12/2015 | Bachrach ............. | G05D 1/0016 |
| | | | | 701/2 |
| 2017/0212529 | A1 * | 7/2017 | Kumar .................. | G01C 21/165 |
| 2018/0232907 | A1 * | 8/2018 | Sung ........................ | G06T 7/80 |

* cited by examiner

*Primary Examiner* — Soo Shin
(74) *Attorney, Agent, or Firm* — Perkins Coie LLP

(57) ABSTRACT

Embodiments are described for detecting optical discrepancies associated with image capture analyzing pixels in multiple images corresponding to common points of reference in a physical environment. In an embodiment, photometric error values are averaged over time to compute the mean error at each pixel. Once the estimate of the mean error has a sufficient number of updates above a specified value, the estimate is thresholded to provide a mask of any optical discrepancies occurring in the stereo pair of images. Applications include detecting optical discrepancies in images captured for use by a visual navigation system in guiding an autonomous vehicle (e.g., an unmanned aerial vehicle).

7 Claims, 23 Drawing Sheets

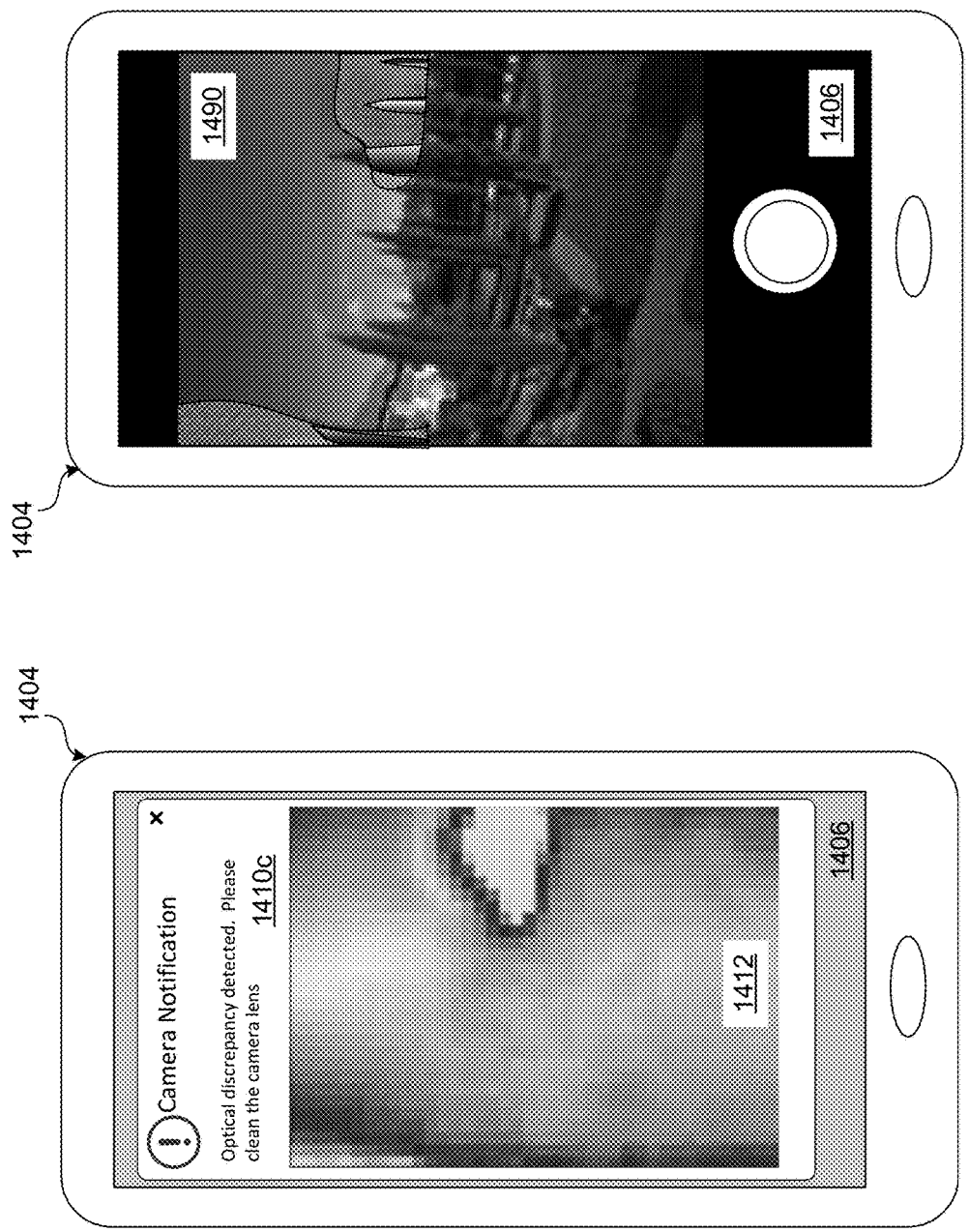

DETECTING OPTICAL DISCREPANCIES IN CAPTURED IMAGES

TECHNICAL FIELD

The present disclosure relates generally to image processing for detecting optical discrepancies, for example, discrepancies caused by dirt, smudges, scratches, and other issues associated with image capture. In certain embodiments, the present disclosure more specifically relates to detecting and alleviating the effects of optical discrepancies in images used to guide autonomous navigation by a vehicle such as an unmanned aerial vehicle (UAV).

BACKGROUND

Various types of devices can be used to capture images of a surrounding physical environment. For example, a digital camera can include an array of optical sensors configured to receive rays of light that are focused via a set of one or more lenses. The light sensed by the optical sensors can then be converted into digital information representing an image of the physical environment from which the light is received.

Increasingly, digital image capture is being used to guide autonomous vehicle navigation systems. For example, a UAV with an onboard image capture device can be configured to capture images of the surrounding physical environment that are then used by an autonomous navigation system to estimate the position and orientation of the UAV within the physical environment. This process is generally referred to as visual odometry. The autonomous vehicle navigation system can then utilize these position and orientation estimates to guide the UAV through the physical environment.

BRIEF DESCRIPTION OF THE DRAWINGS

FIGS. 14A-14D show a series of example outputs based on a detected optical discrepancy;

DETAILED DESCRIPTION

Overview

Various optical issues can impede the capture of quality images by an image capture device. For example, dirt or some other foreign material on the lens of an image capture device can obscure the incoming light rays and lead to artifacts or other issues such as blurriness in the resulting captured images. Damage or calibration faults in any of the sensitive internal optical components of an image capture device can similarly lead to issues in the resulting captured images. The poor image quality resulting from various optical issues may present little more than an annoyance in the context of a personal camera but can lead to more serious consequences in the context of visual navigation systems configured to guide an autonomous vehicle such as a UAV.

Figure 1:
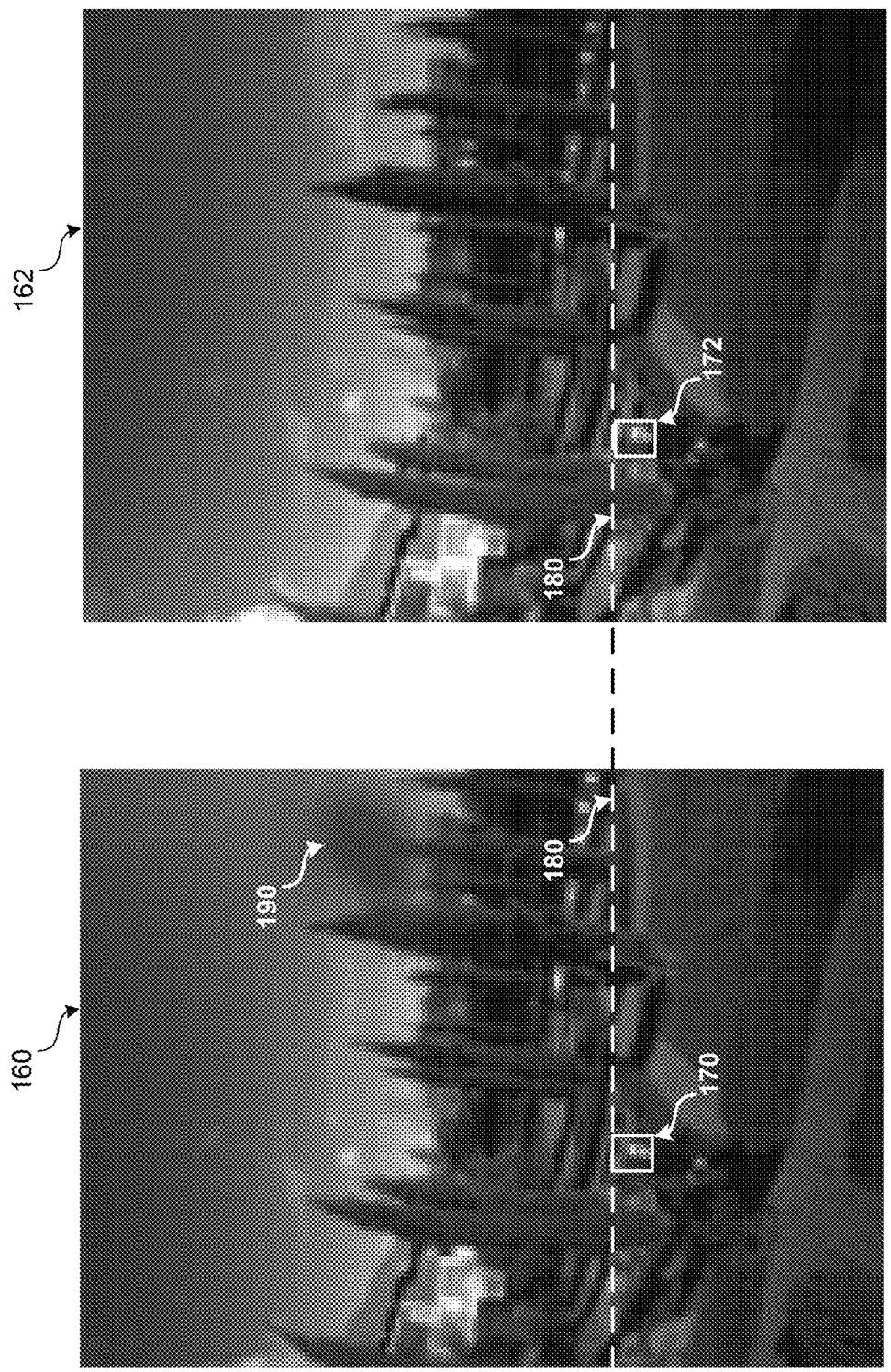
FIG. 1 shows an example stereo pair of images in which optical discrepancies can be detected.

To address the challenges described above, techniques are introduced herein for detecting optical discrepancies between images and for taking corrective actions to alleviate the effects of such optical discrepancies. Consider, for example, a stereo camera system including two adjacent cameras for capturing stereo images of a surrounding physical environment. A resulting stereo image pair captures a field of view of the physical environment from the slightly different positions of each camera comprising the system. FIG. 1 shows an example pair of images captured using such a system. Specifically, image 160 is representative of a field of view from a left camera, and image 162 is representative of a field of view from a right camera adjacent to the left camera.

In such a stereo image pair, points in the three-dimensional (3D) space of the physical environment correspond to pixels in the images that reside along the same epipolar line. Provided that the images are rectified, these pixels will reside along the same horizontal row in the images. For a given pair of stereo images at a given point in time, most pixels in the first image of the pair will correspond to 3D points in the physical environment that also project in the second image of the pair. For example, pixels in the left image 160 representative of a projection of the head of a person (identified by the box 170) will correspond to pixels in the right image 162 representative of a projection of the same head of the person (identified by the box 172) from a slightly different point of view. Further, as shown by the dotted line 180, if the images are rectified, the corresponding pixels in each image will reside along the same row.

Inevitably, at any given time, a portion of the pixels in the pair of images may violate this assumption, for example, due to objects in the physical environment occluding a portion of the field of view of one of the cameras. Most object occlusions will result in momentary discrepancies between the images that change as the stereo camera system moves through the physical environment. In other words, a given pixel in the left image 160 will usually have a matching pixel in the right image 162 that corresponds to the same 3D point in the physical environment. The two corresponding pixels will therefore usually exhibit the same or at least similar photometric characteristics. Optical discrepancies caused by image capture issues will also violate the assumption regarding pixel correspondence but will tend to exhibit persistently high-error matches.

Consider again the pair of images 160 and 162 shown in FIG. 1. The left image 160 includes a region 190 of relatively low contrast that does not find correspondence in the right image 162. This region 190 therefore represents an optical discrepancy between the two images. The optical discrepancy may be the result of a number of different causes. For example, the region 190 may be the out of focus capture of an object, such as a bird or an insect, passing in front of the left camera. As explained above, such a discrepancy is momentary and likely would disappear as the object moves out of view of the left camera due to motion of the left camera and/or the object. Conversely, the region 190 will tend to persist if, on the other hand, the optical discrepancy is caused by an issue with the image capture such as dirt or smudges on the lens of the camera, damage to the optical sensors, calibration errors, image processing errors, etc.

As will be described in more detail below, a technique for detecting optical discrepancies resulting from issues related to image capture can include calculating photometric error using a stereo image pair. In an embodiment, computing photometric error can including computing the difference between pixel values at different locations along epipolar lines. The photometric error for a particular pixel may in some cases represent the minimum photometric error calculated over a range of locations, for example, to account for scene objects at a range of depths. The calculated photometric error values can then be averaged over a period of time to calculate a mean photometric error at each pixel. The mean photometric error values at each pixel can then be thresholded to generate a threshold map exposing regions of relatively high and persistent photometric error that are indicative of optical discrepancies due to image capture issues.

Techniques are also introduced herein for taking steps to correct or at least alleviate the effects of detected optical discrepancies. For example, an image mask can be generated based on the detected optical discrepancy. The generated image mask can be configured to cause a visual navigation system of an autonomous vehicle to ignore certain regions of captured images, for example, to avoid unnecessary course corrections around perceived physical objects that do not actually exist in the physical environment. A generated image mask may also be used to correct a presentation or display of the captured images, for example, by setting a boundary within which new image data is generated to correct the optical discrepancy. Detection of optical discrepancies may also trigger notifications to a user or various system components to take corrective action. For example, a notification may be sent to a device of a user informing the user that the lens of the camera is smudged or dirty. Similarly, a signal may be sent that causes an automatic washing system (e.g., a wiper blade) to activate to remove the dirt or smudge from the lens.

For illustrative clarity, the techniques mentioned above are described with respect to a stereo pair of images; however, this represents an example embodiment and is not to be construed as limiting. In other embodiments, an image capture device may include more than two cameras, and similar processing may be applied across more than two images to detect optical discrepancies. Further, the technique does not necessarily rely on multiple images with overlapping fields of view taken at the same point in time. For example, in a monocular implementation, a mobile image capture device (e.g., coupled to a UAV) may capture a first image at a first point in time while at a first position and a second image at a later point in time while at a second position.

Example Implementations

Figure 2A:
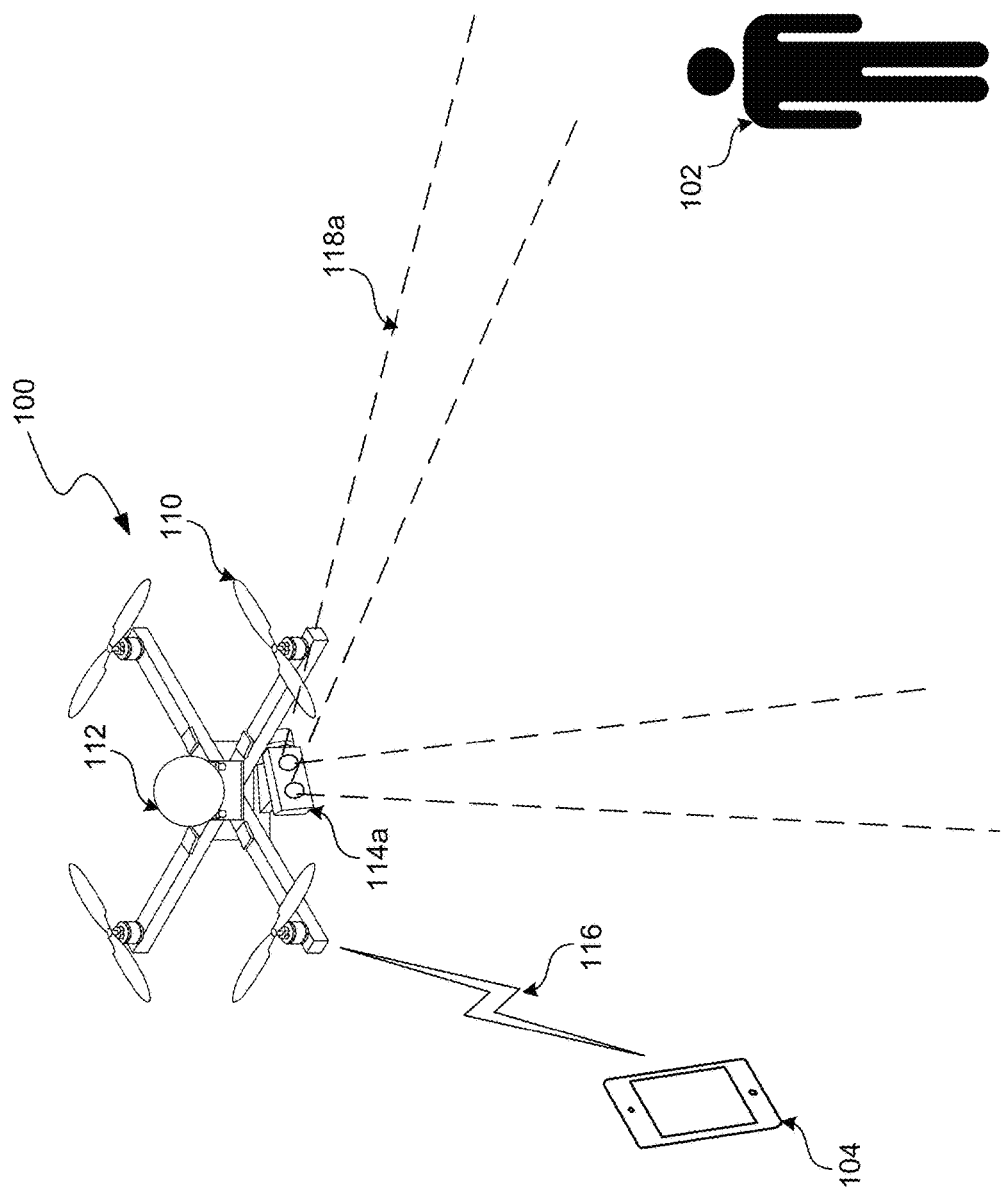
FIGS. 2A-2C show example configurations of a UAV in which one or more of the described techniques can be implemented.
Figure 2B:
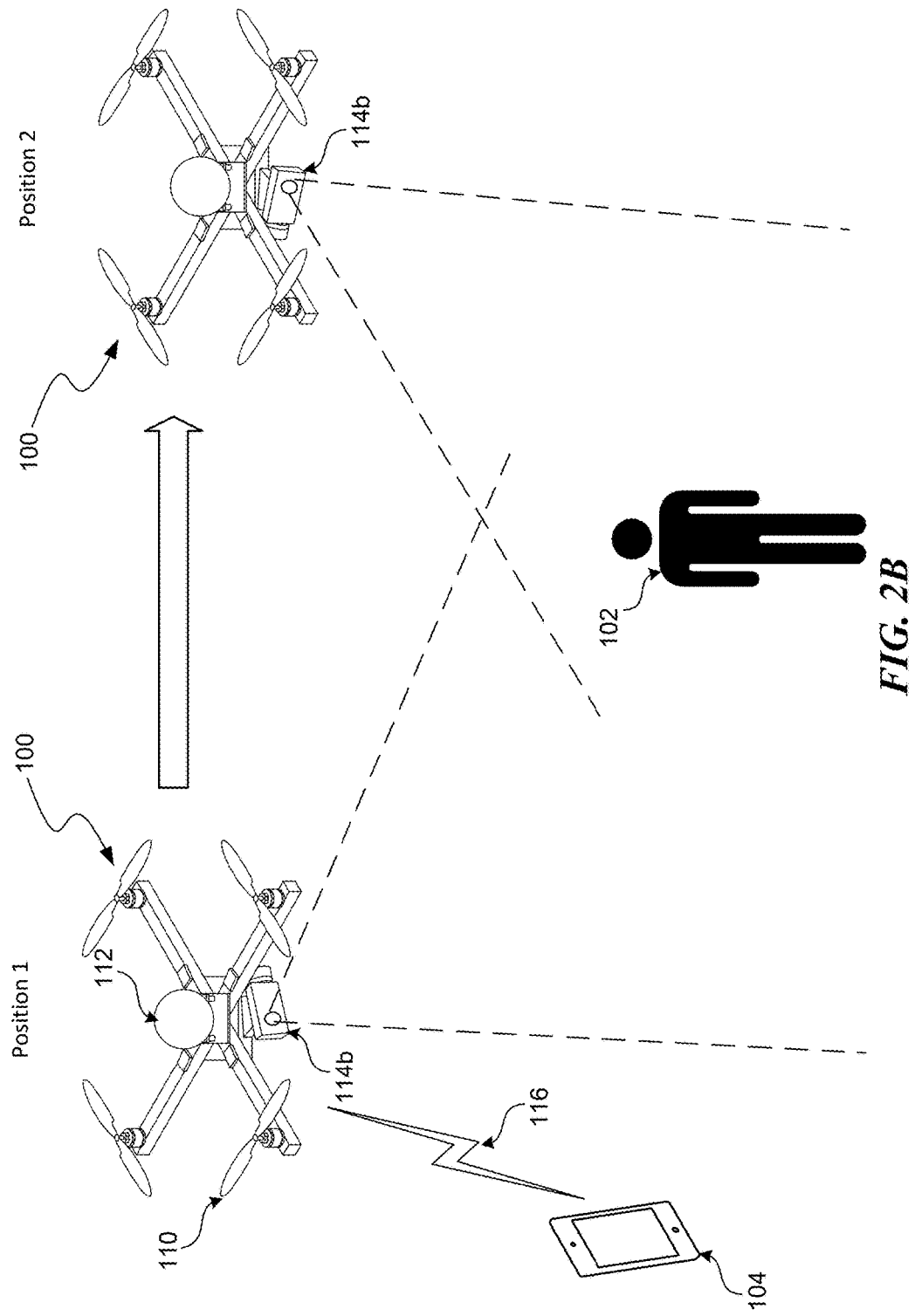
Figure 2C:
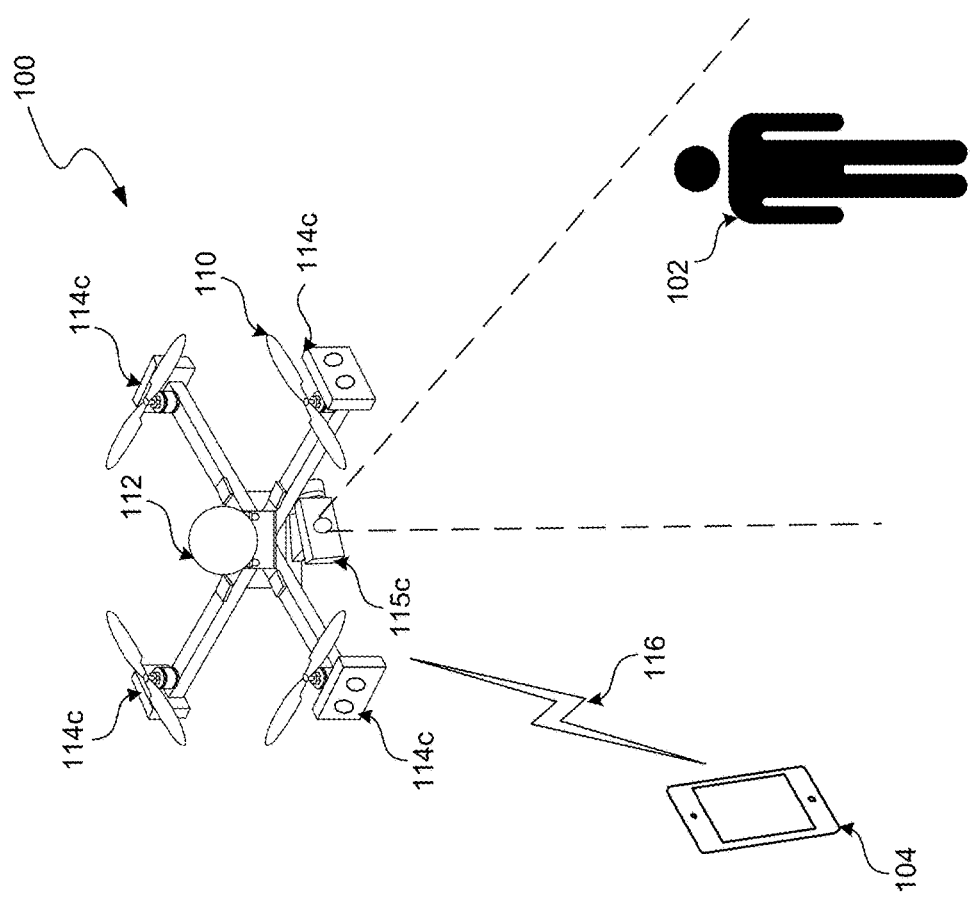

In certain embodiments, the techniques described herein for detecting and alleviating the effects of optical discrepancies associated with image capture can be applied to, as part of or in conjunction with, a visual navigation system configured to guide an autonomous vehicle such as a UAV. FIGS. 2A-2C show example configurations of a UAV 100 within which certain techniques described herein may be applied. In some embodiments, as shown in FIGS. 2A-2C, UAV 100 may be a rotor-based aircraft (e.g., a "quadcopter"). The example configurations of UAV 100, as shown in FIGS. 2A-2C, may include propulsion and control actuators 110 (e.g., powered rotors or aerodynamic control surfaces) for maintaining controlled flight, various sensors for automated navigation and flight control 112, and one or more image capture devices 114a-c and 115c for capturing images (including video) of the surrounding physical environment while in flight. In the example depicted in FIGS. 2A-2C, the image capture devices are depicted capturing an object 102 in the physical environment that happens to be a human subject. In some cases the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by applying visual odometry using images captured by any one or more image capture devices. While in autonomous flight, UAV 100 can also capture images using any one or more image capture device that can be displayed in real time and or recorded for later display at other devices (e.g., mobile device 104). Although not shown in FIGS. 2A-2C, UAV 100 may also include other sensors (e.g., for capturing audio) and means for communicating with other devices (e.g., a mobile device 104) via a wireless communication channel 116. The configurations of a UAV 100 shown in FIGS. 2A-2C represent examples provided for illustrative purposes. A UAV 100 in accordance with the present teachings may include more or fewer components than as shown. Any of the configurations of a UAV 100 depicted in FIGS. 2A-2C may include one or more of the components of the example system 1600 described with respect to FIG. 16. For example, the aforementioned visual navigation system may include or be part of the processing system described with respect to FIG. 16.

As shown in FIG. 2A, the image capture device 114a of the example UAV 100 can include a stereoscopic assembly of two cameras that capture overlapping fields of view of a surrounding physical environment as indicated by the dotted lines 118a. Again, as previously mentioned, the techniques described herein are not limited to an analysis of a single stereoscopic image pair. In some embodiments, the image capture device 114a may include an array of multiple cameras providing up to full 360 degree coverage around the UAV. The UAV 100 may also include an image capture device with just a single camera, for example, as shown in FIG. 2B. As shown in FIG. 2B, in a monocular implementation, a first image may be captured by image capture device 114b when the UAV 100 is at a first position in the physical environment, and a second image may be captured when the UAV 100 is at a second position in the physical environment. In other words, instead of simultaneously capturing images from slightly different positions using a stereoscopic assembly, the first image is captured at a first point in time and the second image is captured at a second point in time.

FIG. 2C shows an example configuration of a UAV 100 with multiple image capture devices configured for different purposes. As shown in FIG. 2C, in an example configuration, a UAV 100 may include one or more image capture devices 114c that are configured to capture images for use by a visual navigation system in guiding autonomous flight by the UAV 100. Specifically, the example configuration of UAV 100 depicted in FIG. 2C includes an array of multiple stereoscopic image capture devices 114c placed around a perimeter of the UAV 100 so as to provide stereoscopic image capture up to a full 360 degrees around the UAV 100.

In addition to the array of image capture devices 114c, the UAV 100 depicted in FIG. 2C also includes another image capture device 115c configured to capture images that are to be displayed but not necessarily used for navigation. In some embodiments, the image capture device 115c may be similar to the image capture devices 114c except in how captured images are utilized. However, in other embodiments, the image capture devices 115c and 114c may be configured differently to suit their respective roles.

In many cases, it is generally preferable to capture images that are intended to be viewed at as high a resolution as possible given certain hardware and software constraints. On the other hand, if used for visual navigation, lower resolution images may be preferable in certain contexts to reduce processing load and provide more robust motion planning capabilities. Accordingly, the image capture device 115c may be configured to capture higher resolution images than the image capture devices 114c used for navigation.

The image capture device 115c can be configured to track a subject 102 in the physical environment for filming. For example, the image capture device 115c may be coupled to a UAV 100 via a subject tracking system such as a gimbal mechanism, thereby enabling one or more degrees of freedom of motion relative to a body of the UAV 100. In some embodiments, the subject tracking system may be configured to automatically adjust an orientation of an image capture device 115c so as to track a subject in the physical environment. In some embodiments, a subject tracking system may include a hybrid mechanical-digital gimbal system coupling the image capture device 115c to the body of the UAV 100. In a hybrid mechanical-digital gimbal system, orientation of the image capture device 115c of about one or more axes may be adjusted by mechanical means, while orientation about other axes may be adjusted by digital means. For example, a mechanical gimbal mechanism may handle adjustments in the pitch of the image capture device 115c, while adjustments in the roll and yaw are accomplished digitally by transforming (e.g., rotate, pan, etc.) the captured images so as to provide the overall effect of three degrees of freedom.

While the techniques for detecting and alleviating the effects of optical discrepancies can be applied to aid in the guidance of an autonomous UAV, they are not limited to this context. The described techniques may similarly be applied to assist in the autonomous navigation of other vehicles such as automobiles or watercraft.

Figure 3A:
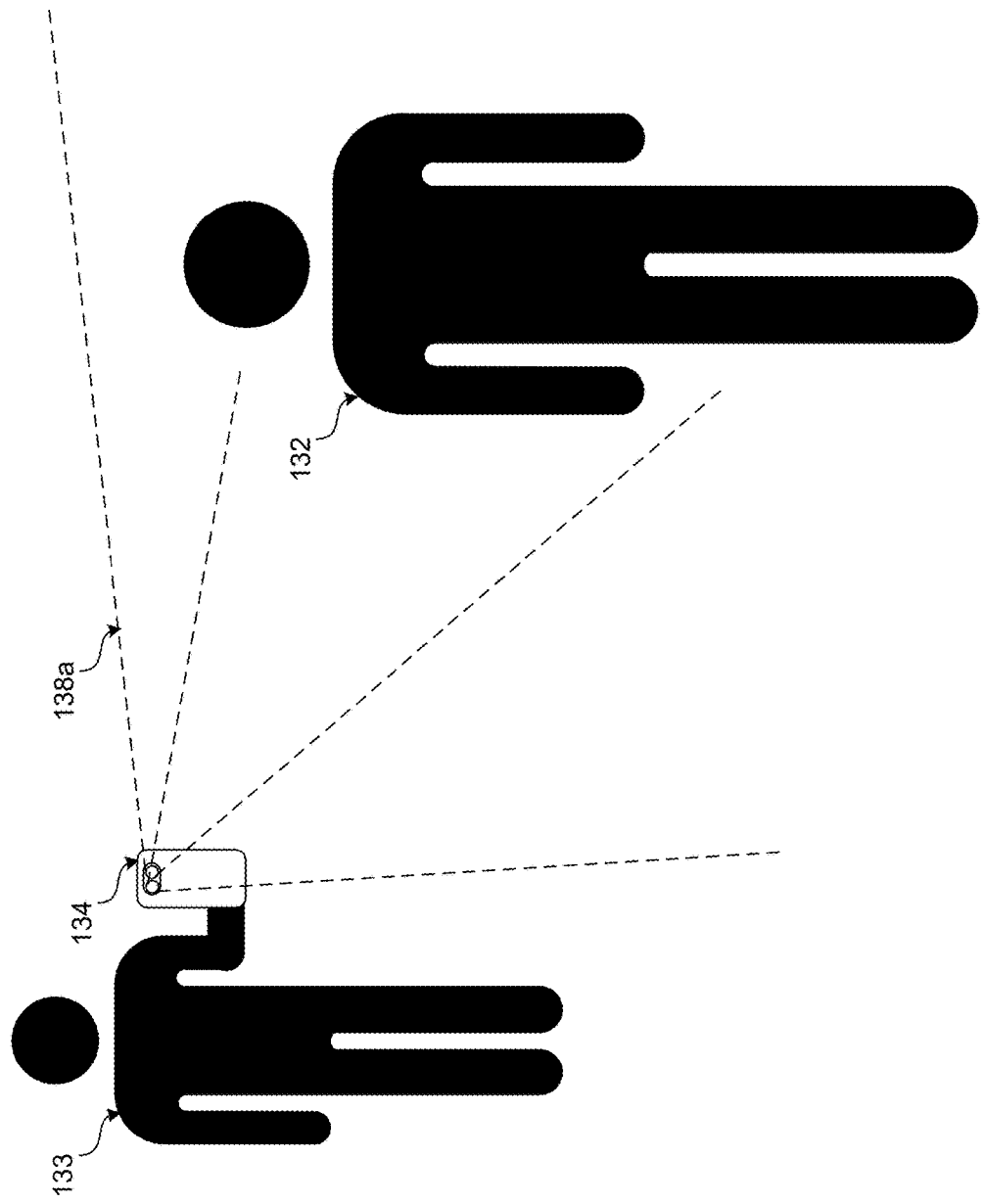
FIGS. 3A-3B show example configurations of a hand-held image capture device in which one or more of the described techniques can be implemented.
Figure 3B:
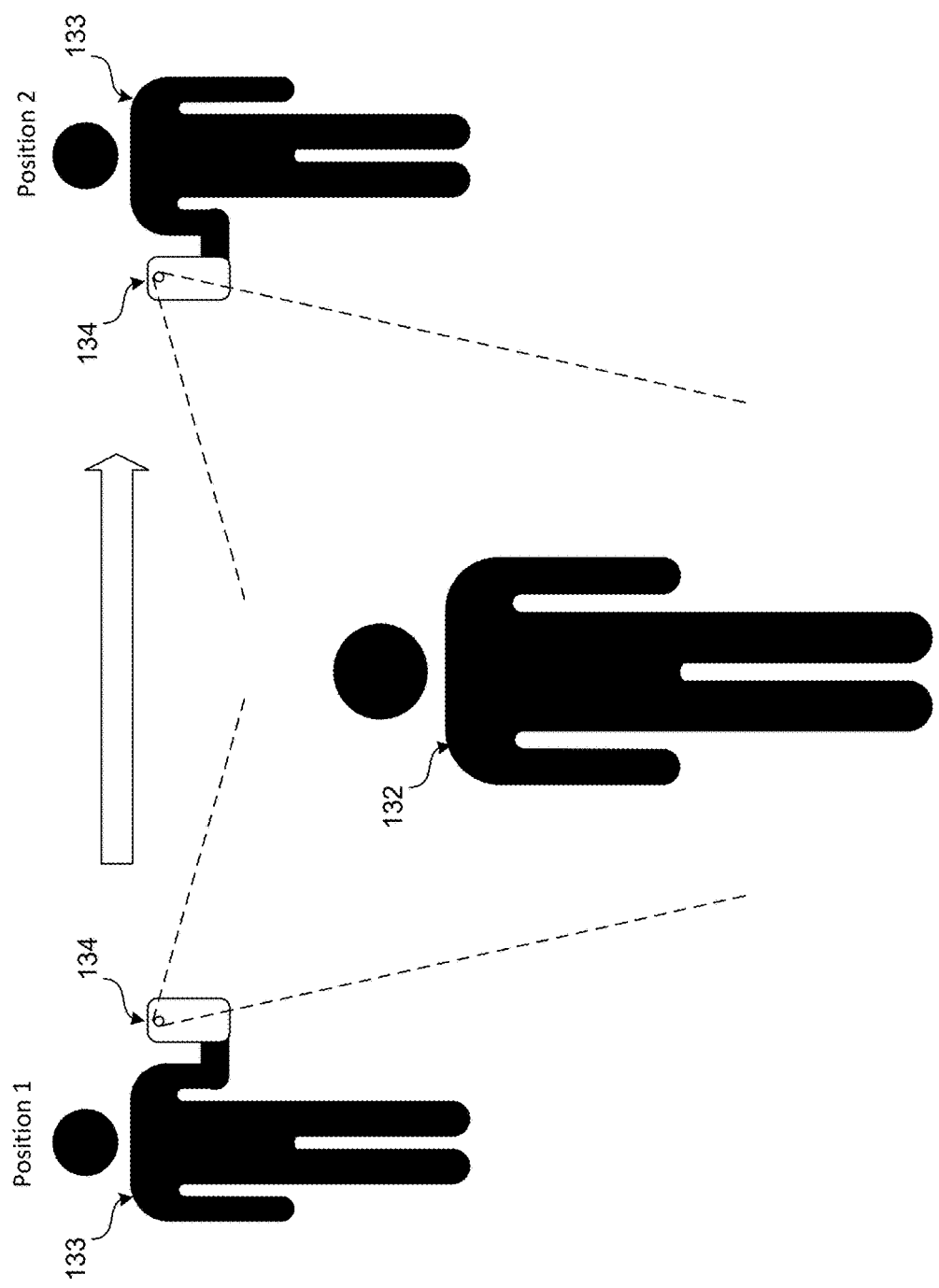

The described techniques may also be applied to other contexts involving image capture that are completely unrelated to autonomous vehicle navigation. For example, the detection of optical discrepancies and corrective actions may be applied to an image capture device of a digital camera or a mobile computing device such as a smart phone or tablet device, for example, as shown in FIGS. 3A-3B. FIGS. 3A-3B depict scenarios similar to those shown in FIGS. 2A-2B (respectively) except that an image capture device is instead mounted to or integrated in a hand-held mobile device 134 such as a smart phone. As shown in FIGS. 3A-3B, a user 133 is using the mobile device to capture images of the surrounding physical environment including a physical object in the form of a human subject 132.

In the example scenario depicted in FIG. 3A, the mobile 134 includes a stereoscopic assembly of two cameras that capture overlapping fields of view of a surrounding physical environment as indicated by the dotted lines 138a. Again, as previously mentioned, the techniques described herein are not limited to an analysis of single stereoscopic image pair. In some embodiments, the mobile device 134 may include an array of multiple cameras. Also, in some embodiments, the image capture device may include just a single camera, for example, as shown in FIG. 3B. As shown in FIG. 3B, a first image is captured when the mobile device 134 is at a first position, and a second image is captured when the mobile device 134 is at a second position.

Detecting Optical Discrepancies

Figure 4:
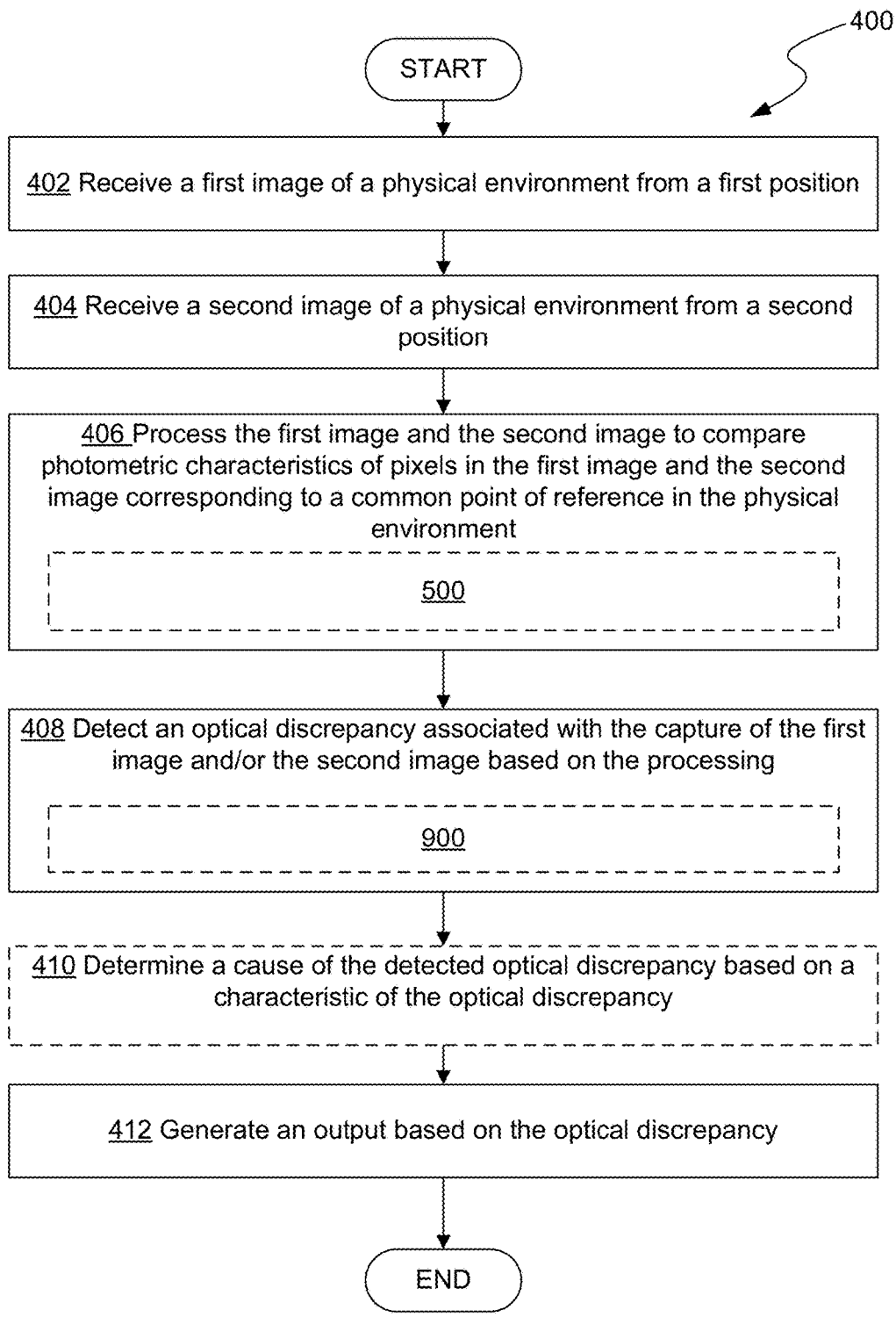
FIG. 4 shows a flow chart of an example process for detecting an optical discrepancy.

FIG. 4 is a flow chart of an example process 400 for detecting an optical discrepancy. One or more steps of the example process 400 may be performed by any one or more of the components of the example processing systems described with respect to FIG. 16 or 17. For example, the process depicted in FIG. 4 may be represented in instructions stored in memory that are then executed by a processing unit. The process 400 described with respect to FIG. 4 is an example provided for illustrative purposes and is not to be construed as limiting. Other processes may include more or fewer steps than depicted while remaining within the scope of the present disclosure. Further, the steps depicted in example process 400 may be performed in a different order than is shown.

As shown in FIG. 4, the example process 400 begins at step 402 with receiving a first image of a physical environment from a first position and at step 404 with receiving a second image of the physical environment from a second position. As previously discussed, the images received at steps 402 and 404 may be captured by an image capture device including one or more cameras, for example, similar to the image capture device 114 associated with UAV 100 or an image capture device of a mobile device 104 or 134. In some embodiments, the processing system performing the described process may be remote from the image capture device capturing the images. Accordingly, in some embodiments, the images may be received via a computer network, for example, a wireless computer network.

As previously discussed with respect to FIGS. 2A and 3A, in some embodiments, the first and second image may be captured by an image capture device including multiple cameras. For example, in a stereo image capture device including a first camera and a second camera, the first image may be captured by the first camera and the second image may be captured by the second camera. In such an implementation, the first and second images may be captured at substantially the same point in time.

Alternatively, as described with respect to FIGS. 2B and 3B, in some embodiments, the first image may be captured by an image capture device (e.g., a monocular image capture device) at a first point in time when the image capture device is at a first position and the second image may be captured by the image capture device at a second (i.e., later) point in time when the image capture device is at a second position different than the first position.

Alternatively, as described with respect to FIG. 2C, in some embodiments, the first image may be captured by a first image captured device and the second image may be captured by a second image captured device associated with a different system. Consider again the configuration of UAV 100 depicted in FIG. 2C. In such an embodiment, separate image capture systems can be used together to detect optical discrepancies. For example, a first image captured by any of the stereoscope image navigation image captured devices may be processed with a second image captured by an image captured device 115c (i.e., that is configured to capture images for display) to detect optical discrepancies in either device.

Use of the term "image" in this context may broadly refer to a single still image, or to a captured video including multiple still frames taken over a period of time. For example, the "first image" referenced at step 402 may refer to a single still image received from a first camera or may refer to a series of still frames received from that first camera over a period of time. Further, although process 400 only references a first and second image, it shall be appreciated that more than two images may be received and processed.

Process 400 continues at step 406 with processing the received first image and second image to compare photometric characteristics of pixels in the respective images that correspond to a common point of reference in the physical environment. For example, as previously described, in a given set of two images, most pixels in the first image will correspond to 3D points in the physical environment that also project in the second image. If a first pixel in the first image corresponds to the same 3D point in the physical environment as a second pixel in the second image, it is assumed that the two pixels will exhibit the same or at least similar photometric characteristics. Additional details regarding the processing of images at step 406 are described with respect to FIGS. 5A-5B.

To preserve computational resources, process 400 may involve down-sampling received images to reduce resolution before performing processing at step 406. This may also have the added benefit of reducing false discrepancy indicators that may be introduced through digital noise in higher resolution images. In any case, down-sampling to reduce the resolution is optional and may be performed to varying degrees depending on the requirements of the particular implementation.

In some situations, both images may be down sampled. In other situations, one image may be down-sampled to match the resolution of the other image. Consider again the configuration of a UAV 100 shown in FIG. 2C. As mentioned, image capture devices 114c used for visual navigation may capture lower resolution images than an image capture device 115c that is used for capturing high resolution images for display. If in such an embodiment, the first image is from image capture device 114c and the second image is from image capture device 115c, step 406 may include down-sampling and/or transforming the second image to match a resolution and/or dimension of the first image.

The comparison of corresponding pixels may include searching disparate values along epipolar lines. If the images are rectified, all epipolar lines will run parallel to the horizontal axis of the view plane of the image. In other words, corresponding points in each image will have identical vertical coordinates. Accordingly, search along an epipolar line is greatly simplified if the images are rectified. In some embodiments, for example, in the case of a stereoscopic assembly, the two cameras may be positioned and calibrated such that the resulting images are in effect rectified. However, as will be described in some embodiments, this may not be the case. Accordingly, in some embodiments, process 400 may involve rectifying the received images before performing processing at step 406. Specifically, this step of rectifying received images may involve transforming (i.e., digitally manipulating) any one or more of the received images based on determined epipolar lines such that the resulting epipolar lines in the transformed images run parallel to the horizontal axis of the view plane.

Process 400 continues at step 408 with detecting an optical discrepancy associated with the capture of the first image and/or the second image based on the processing at step 406. In this context, the term "optical discrepancy" can broadly describe any discrepancy or deviation from an expectation regarding a set of images, for example, the first image and second image. More specifically, in some embodiments, an optical discrepancy is detected when, based on the comparing at step 406, one or more corresponding pixels are identified that violate the assumption described above. In other words, if a first pixel in the first image corresponds to the same 3D point in the physical environment as a second pixel in the second image, and the two pixels do not exhibit the same or at least similar photometric characteristics, that may be indicative of an optical discrepancy caused by an issue associated with the capture of either the first image or second image. Additional details regarding the detection of optical discrepancies at step 408 are described with respect to FIG. 9.

In many situations, the comparison of a single pixel to another pixel may not provide sufficient data to determine if an optical discrepancy exists. For example, momentary occlusion by another object in the physical environment and/or digital noise introduced during the capture process may lead to corresponding pixels exhibiting photometric discrepancies that are not necessarily indicative of an issue involving image capture. Accordingly, in some embodiments, detecting an optical discrepancy may include tracking, over a period of time, the differences in photometric characteristics of pixels in the first image and in the second image corresponding to a common 3D point (i.e., point of reference) in the physical environment.

In some embodiments, process 400 optionally continues at step 410 with determining a cause of the optical discrepancy based on a characteristic of the optical discrepancy. For example, any given optical discrepancy may be caused by a number of issues that are related and unrelated to image capture. An unrelated issue may include an occulting object, as previously mentioned. Issues related to image capture may include a foreign material (e.g., dirt, sap, water, etc.) on a surface of a lens of an image capture device that captured any of the received images. An issue related to image capture may also include an imperfection or damage to an optical component of an image capture device that captured any of the received images. For example, a scratch on the surface of a lens or an improperly manufactured lens may result in optical discrepancies. An issue related to image capture may also include a failure of or an error caused by a component in a processing system associated with the image capture device. For example, software instructions for converting optical sensor data into a rendered image may exhibit errors that cause optical discrepancies. An issue related to image capture may also include improper calibration of the image capture device (or any underlying components) that captured any of the received images. Additional details regarding determining a cause of an optical discrepancy at step 410 are described with respect to FIG. 11.

Process 400 concludes at step 412 with generating an output based on the detected optical discrepancy. As will be described, an output in this context may include any output that is indicative of the detected optical discrepancy, in some cases including a cause of the optical discrepancy. The output may include any of generated machine data (e.g., an event indicative of the detected optical discrepancy), a notification informing a user of the detected optical discrepancy, a graphical output (e.g., a threshold map, image mask, manipulated image, or visual notification), or a control signal (e.g., configured for any type navigation system or component such as a flight controller 1608 described with respect to FIG. 16).

In some embodiments, the steps of process 400 may be performed in real time, or near real time, as they are captured at an image capture device. For example, in some embodiments, the example process 400 may be configured to detect optical discrepancies in image capture as an image capture device (e.g., mounted to a UAV 100) moves through a physical environment. In this context, "real time" or "near real time" means virtually simultaneous from a human perception standpoint (e.g., within milliseconds) but will inevitably include some temporal delay due to data transfer and processing capabilities of the systems involved. Alternatively, in some embodiments, example process 400 may be part of a post-production analysis of captured images.

Figure 5A:
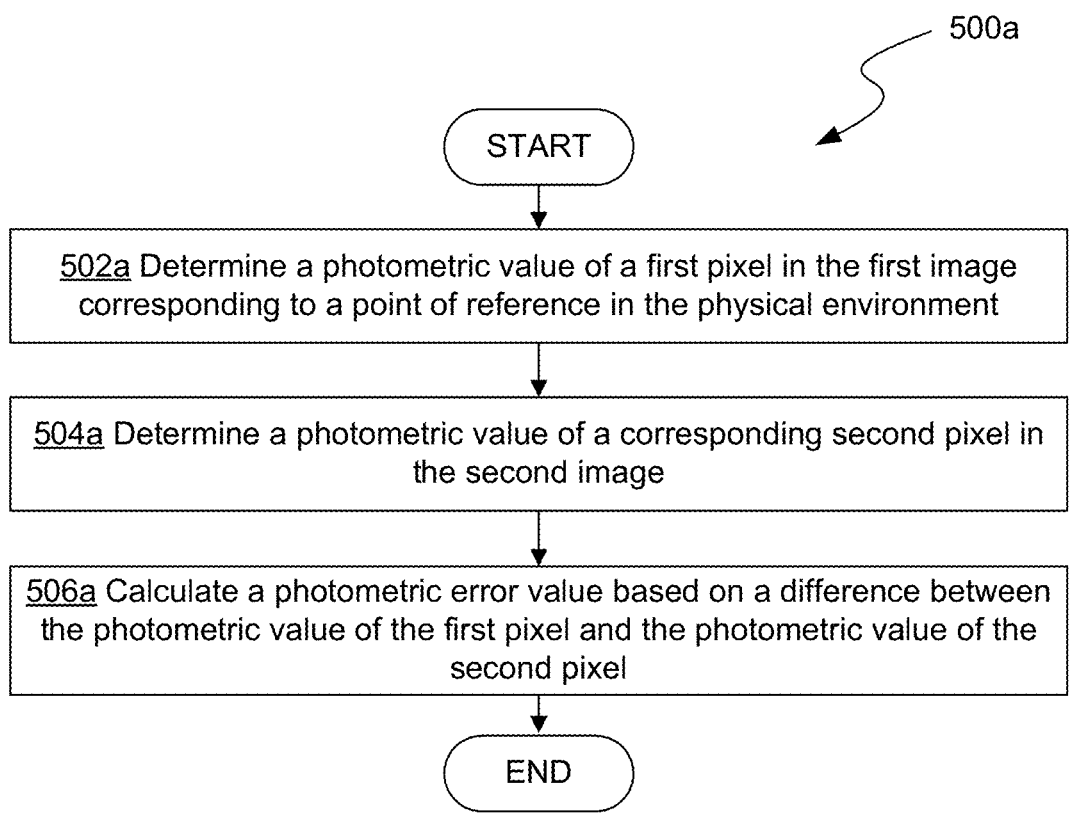
FIGS. 5A-5B show flow charts of example processes for calculating photometric errors between corresponding pixels in captured images.
Figure 5B:
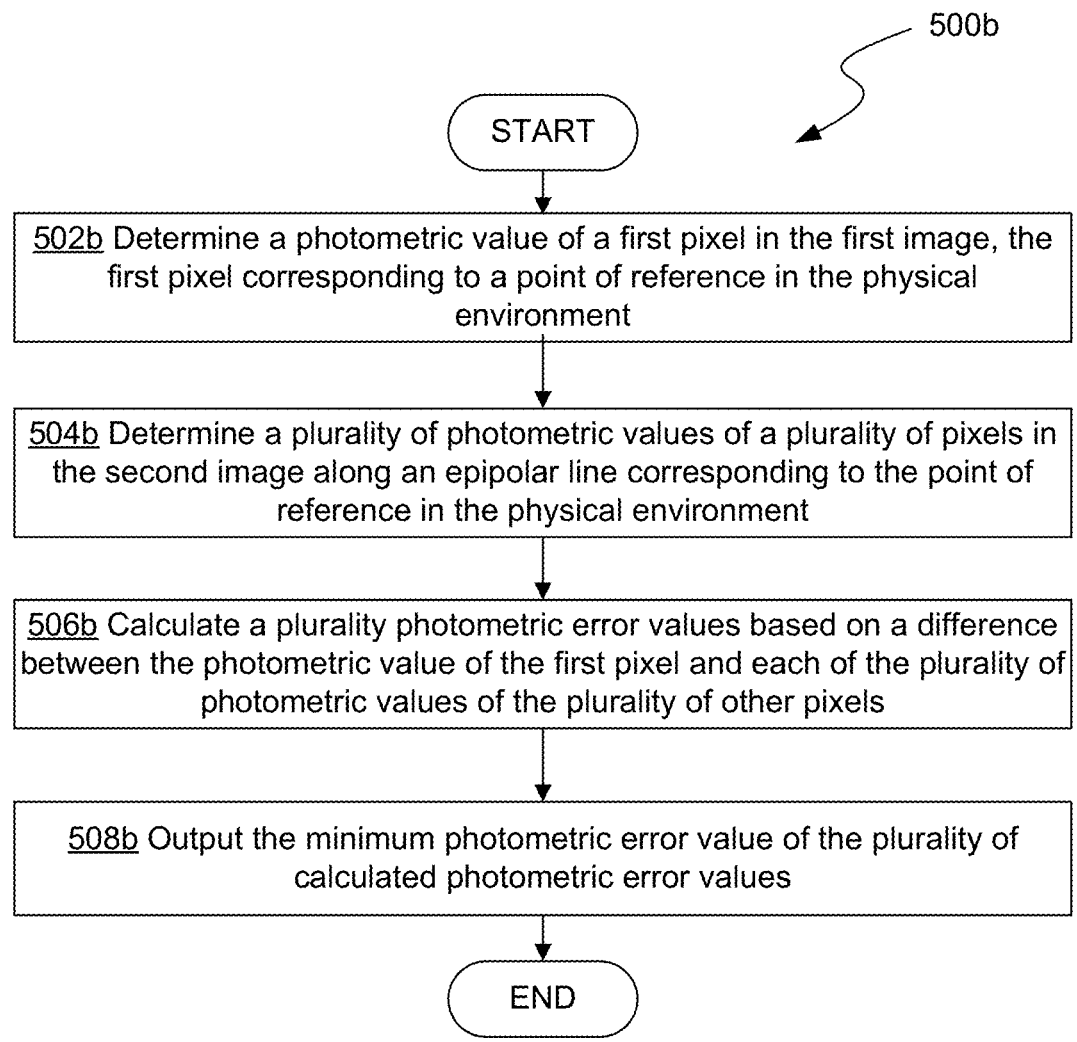

FIGS. 5A-5B are flow charts describing example processes 500a and 500b for calculating photometric errors between corresponding pixels. One or more steps of the example processes 500a or 500b may be performed by any one or more of the components of the example processing systems described with respect to FIG. 16 or 17. As previously mentioned, some or all of example processes 500a and 500b may represent a sub process performed at step 406 in example process 400 described above. The processes 500a and 500b described with respect to FIGS. 5A-5B are examples provided for illustrative purposes and are not to be construed as limiting. Other processes may include more or fewer steps than depicted while remaining within the scope of the present disclosure. Further, the steps depicted in example processes 500a and 500b may be performed in a different order than as shown.

As shown in FIG. 5A, example process 500a begins at step 502a with determining a photometric value of a first pixel in the first image, the first pixel corresponding to a point of reference in the physical environment. A "photometric value" in this context refers to any quantification of a measurement of light at a particular pixel in an image. Stated differently, the photometric value may represent an intended interpretation (i.e., output) of the underlying data associated with a given pixel in a digital image. For example, data associated with a given pixel in a digital image will define certain characteristics of the light output by a pixel in a display when displaying the image. A photometric value in the image may therefore include or be based on that underlying pixel data.

Process 500a continues at step 504a with determining a photometric value of a corresponding second pixel in the second image. In some embodiments, this corresponding second pixel in the second image may simply be the pixel having the same pixel coordinate as the first pixel. In other words, process 500a may involve determining an absolute difference between a set of two or more images. In some embodiments, the corresponding second pixel in the second image may correspond to the same 3D point of reference in the physical environment as the first pixel. In other words, the location of the corresponding second pixel in the second image will depend on the relative difference in pose of the camera capturing the first image and the camera capturing the second image.

Process 500a continues at step 506a with calculating a photometric error value based on a difference between the photometric value of the first pixel and the photometric value of the second pixel. In some embodiments, this photometric error value may simply be an absolute difference between the photometric value of the first pixel and the photometric value of the second pixel. In other embodiments, the photometric error value may be weighted or adjusted based on any number of factors such as location in the image, lighting conditions, photometric values of adjacent pixels, etc.

As mentioned above, pixels in two or more images that correspond to the same point of reference in the physical environment may be at different locations in the two or more images. This is commonly referred to as the correspondence problem. To identify a corresponding pixel in an image it may be necessary to search in an area of the image in which the pixel is to be expected given the relative position and orientation of a camera capturing the first image and the second image. Epipolar geometry can be used, in some embodiments, to solve this correspondence problem. Epipolar geometry generally describes the intrinsic projective geometry between two views representing either two cameras at different positions and/or orientations or a change in position and/or orientation of a single camera.

Figure 6:
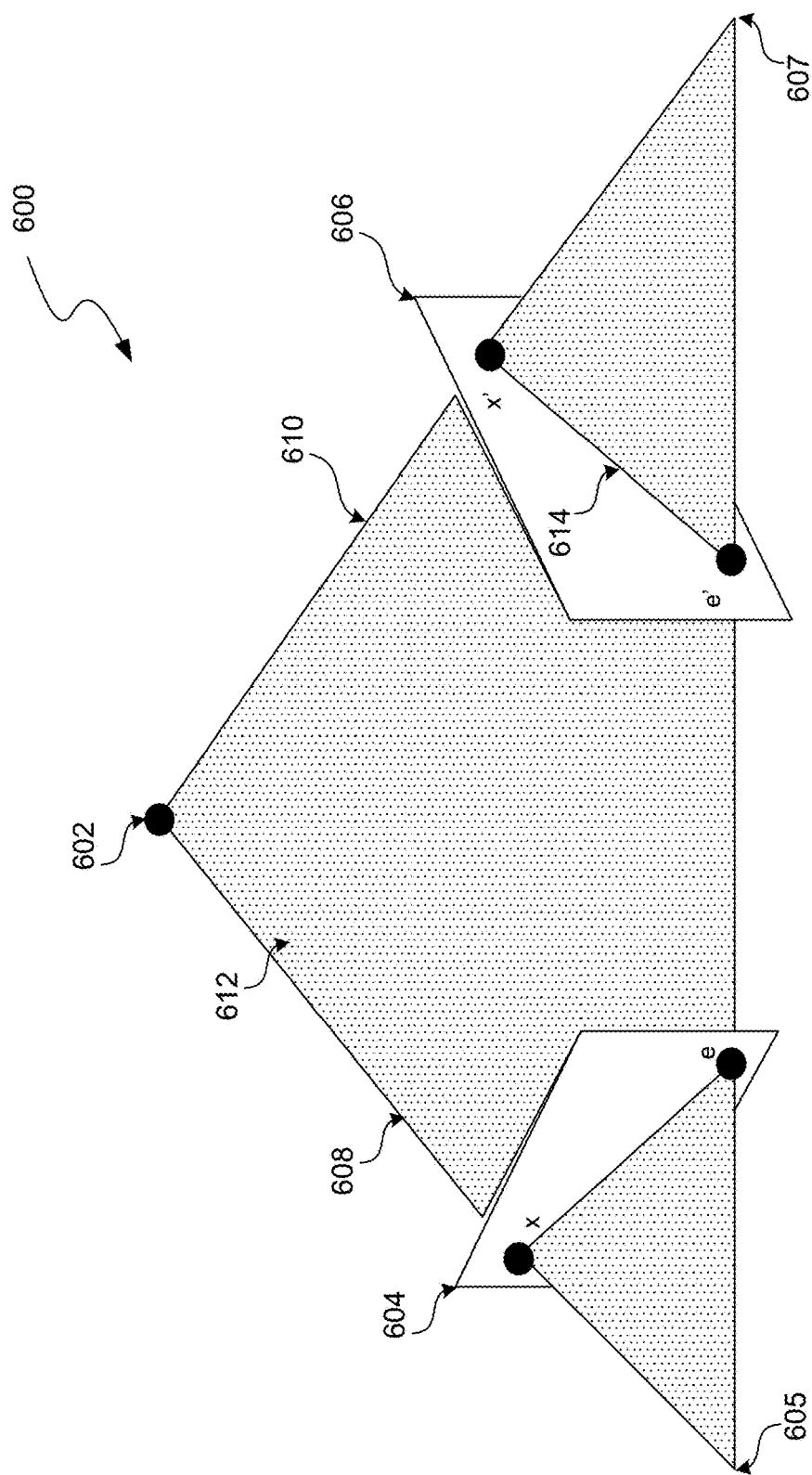
FIG. 6 shows a diagram illustrating an example epipolar geometry.

FIG. 6 illustrates an example of epipolar geometry 600 describing the projective geometry of a particular point of reference 602 in the 3D space in a first image plane 604 by a camera at a first position and a second image plane 606 by a camera at a second position. As shown in FIG. 6, the projection of the point of reference 602 in the 2D first image plane 604 is represented at point x, which represents a point of intersection at the first image plane 604 of a line 608 defined by the point of reference 602 and the optical center 605 of the camera at the first position. Similarly, the projection of the 3D point of reference 602 in the 2D second image plane 606 is represented at point x', which represents a point of intersection at the second image plane 606 of a line 610 defined by the point of reference 602 and the optical center 607 of the camera at the second position. The 2D lines 608 and 610 together define a plane 612 referred to as the epipolar plane. The line at which the epipolar plane 612 intersects an image plane is referred to as an epipolar line. For example, in FIG. 6, the epipolar line at image plane 606 is shown at 614.

If the projection point x in the first image plane 604 of the point of reference 602 is known, then the epipolar line 614 in the second image plane 606 is known. Further, the point of reference 602 projects into the second image plane 606 at the point x' which must lie on the epipolar line 614. This means that for each point observed in one image, the same point must be observed in the other image on a known epipolar line for that image. This provides an epipolar constraint that holds that the projection of a point of reference 602 in a first image plane 604 must be contained along the epipolar line 614 in the second image plane.

Figure 7:
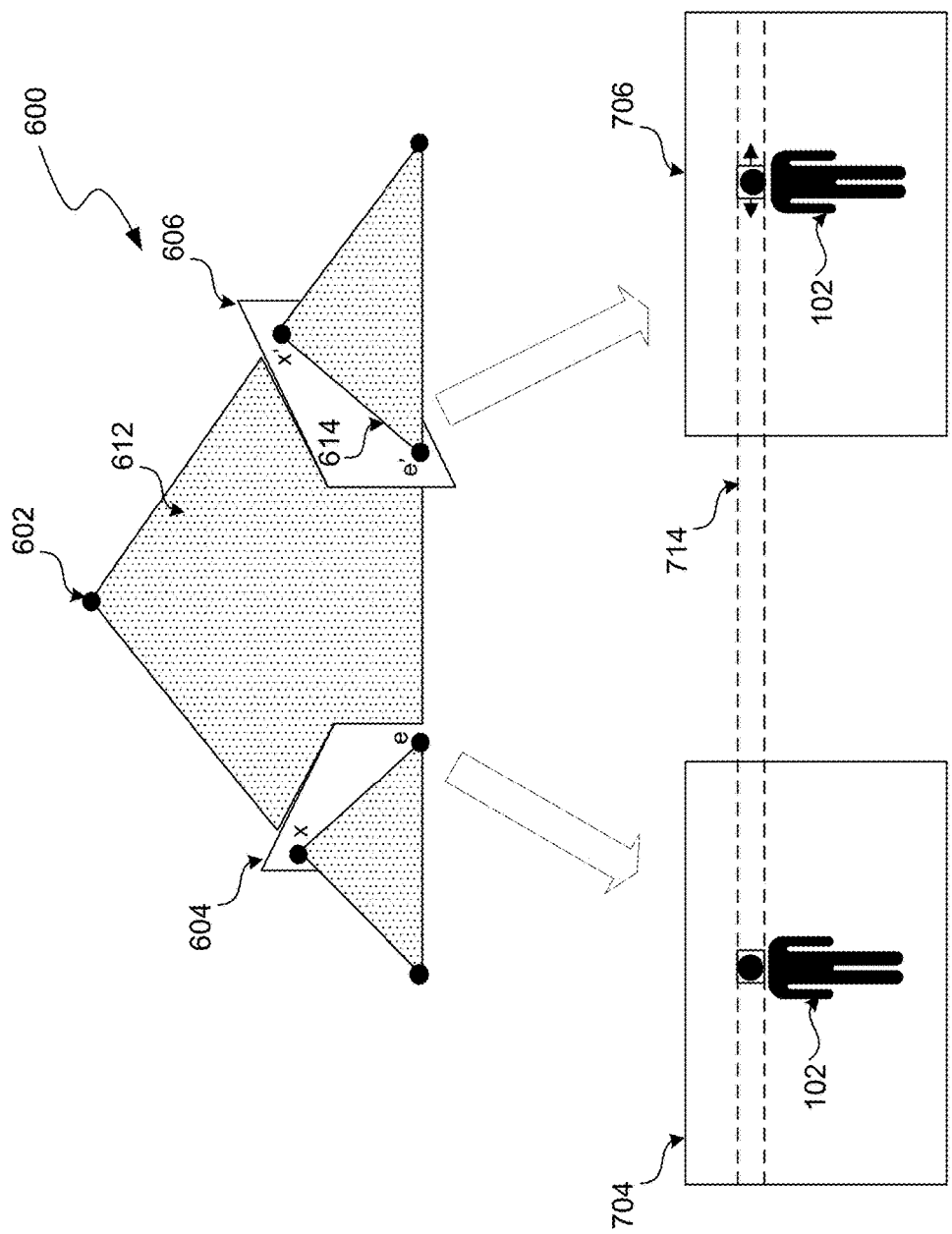
FIG. 7 shows a diagram illustrating the rectification of multiple images.

As illustrated in FIG. 6, the example epipolar line 614 in the second image plane 606 is diagonal, meaning that the correspondence search space is two dimensional. However, if two image planes are aligned so as to be coplanar, the epipolar line becomes horizontal. In such a case, if the point in a first image is known, the corresponding point can be found in the second image by searching in one dimension along the same horizontal line or row of pixels. In some embodiments, this result is achieved by aligning two cameras side-by-side, for example, as part of a stereo image capture system. However, in practice, such precision alignment can be impractical to achieve and/or to maintain. Accordingly, in some embodiments, an image transformation process is performed to rectify the two or more images such that their respective epipolar lines run parallel to their respective horizontal axes and such that corresponding pixels in each image have identical vertical coordinates. For example, FIG. 7 illustrates the rectification of the first image plane 604 and second image plane 606 of FIG. 6 into a transformed image plane 704 and transformed image plane 706 (respectively). As shown in FIG. 7, a pixel corresponding to the same point of reference in the physical environment (e.g., the head of a depicted human subject 102) will reside along the same row 714 of pixels. Accordingly, if a pixel in the first image 704 along row 714 is known, a corresponding pixel in the second image 706 can be found by searching along row 714.

Returning to FIG. 5B, a flow chart of another example process 500b is described for calculating photometric error between images that takes into account photometric values of neighboring pixels. For example, process 500b can include taking into account photometric values of a plurality of pixels along an epipolar line corresponding to a particular point of reference in the physical environment. Such a process can be applied, for example, to address the correspondence problem discussed above. Such a process can also be applied as a regularization measure, for example, to prevent digital noise from leading to incorrect photometric error calculations. The example process 500b described below can be applied alternatively or in addition to the example process 500a described above. The example process 500b is described with respect to the example set of two images 804 and 806 in FIGS. 8A and 8B for illustrative purposes, but is not to be construed as limiting.

Figure 8A:
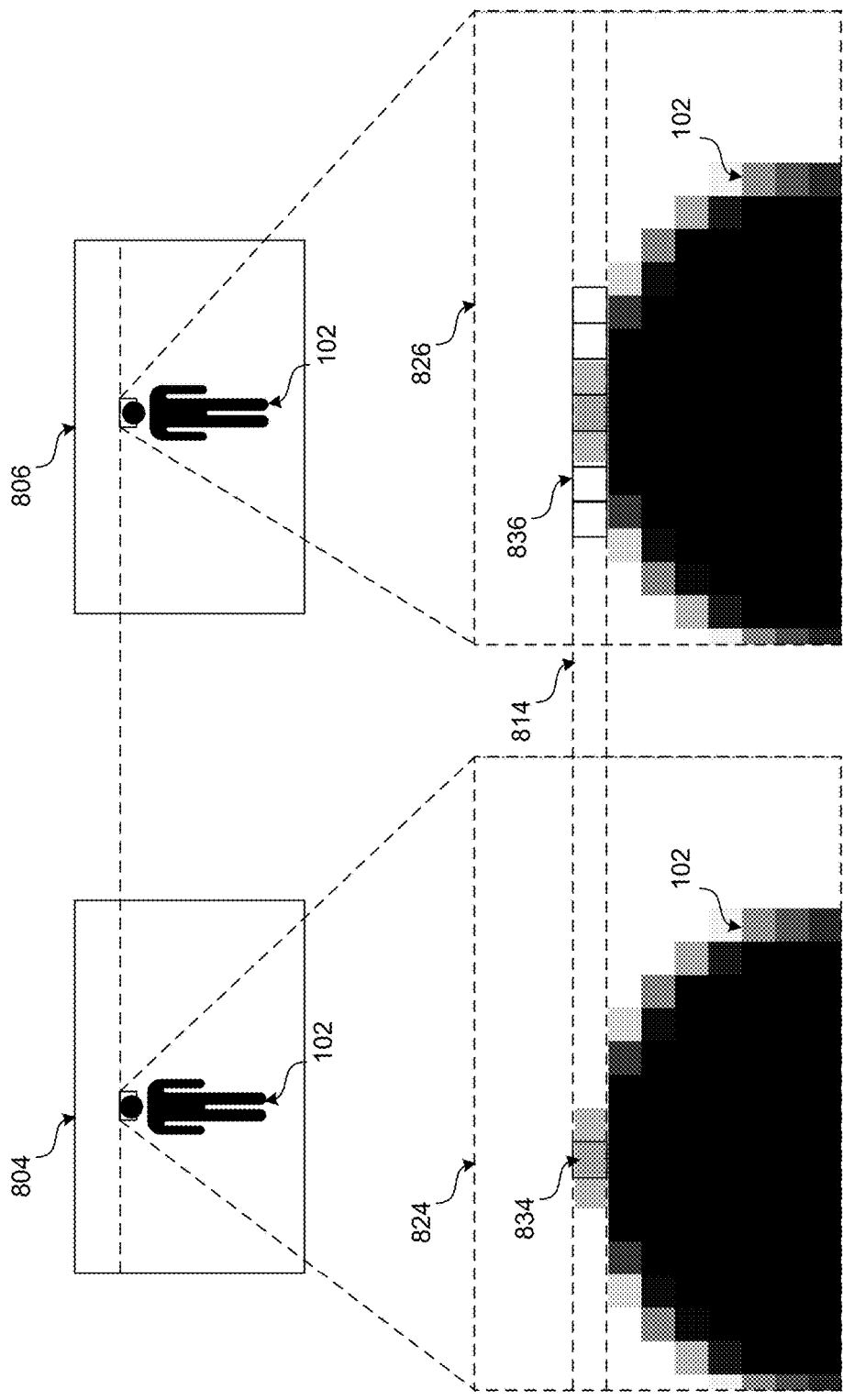
FIGS. 8A-8B show diagrams illustrating example processes for comparing pixels in a set of rectified images.
Figure 8B:
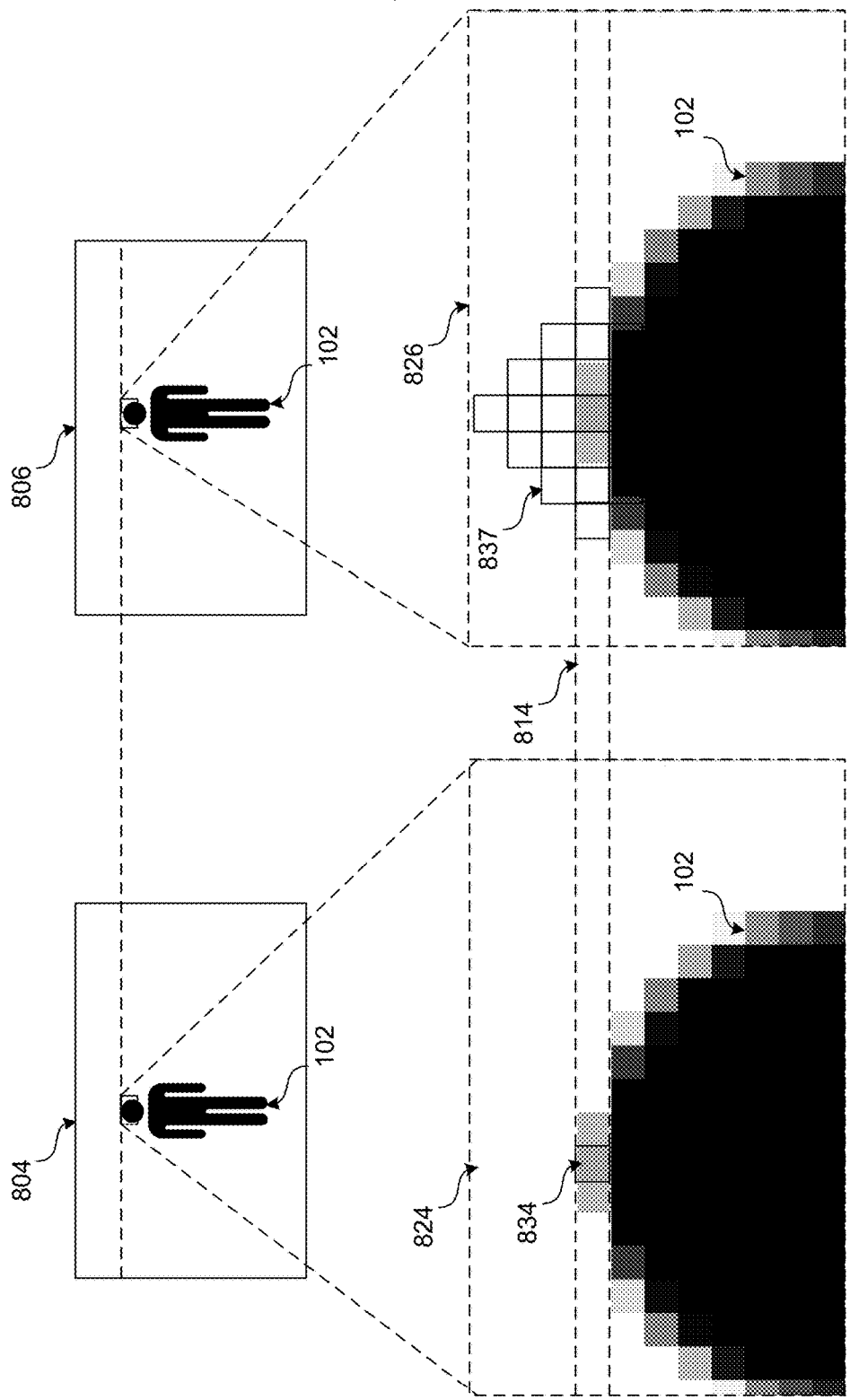

Process 500b begins at step 502b with determining a photometric value of a first pixel in the first image, the first pixel corresponding to a point of reference in the physical environment. For example, with reference to FIG. 8A, step 502b involves determining a photometric value of a first pixel 834 in a first image 804 as shown in the detail 824 of the first image 804. As shown in FIGS. 8A and 8B, in this example, the first pixel 834 corresponds to the top of the head of human subject 102 in the physical environment.

Returning to FIG. 5B, process 500b continues at step 504b with determining a plurality of photometric values of a plurality of pixels in a second image. For example, the plurality of pixels may be along an epipolar line corresponding to the point of reference in the physical environment. For example, with reference to FIG. 8A, step 504b involves determining photometric values for multiple pixels 836 along the epipolar line corresponding to the point of reference (e.g., the top of the head of human subject 102) in the second image 806 as shown at detail 826. Note that in the illustrated example of FIG. 8A, the two images 804 and 806 are rectified (either through digital transformation of camera alignment), therefore the multiple pixels in the second image 836 are all along the same row 814 of pixels. In other words, the first pixel 834 in the first image 804 and the multiple pixels 836 in the second image 806 all have the same vertical coordinates. Alternatively, or in addition, the multiple pixels in the second image 806 may be on multiple rows in a region surrounding a given pixel. For example, FIG. 8B shows a variation of the example shown in FIG. 8A in which the multiple pixels 837 include neighboring pixels in multiple directions. Performing this analysis on rectified images simplifies the processing; however, image rectification is not necessary in all embodiments.

In some embodiments, the multiple pixels 836 that are processed at step 504b may include all of the pixels along the epipolar line in the second image 806. However, in some embodiments, to reduce processing load and to improve results, the multiple pixels 836 may be limited to a region along the epipolar line in which the corresponding pixel is expected. Consider, for example, an embodiment involving a stereo image capture system including two cameras aligned next to each other. In an ideal system, a point in the physical environment at an infinite distance from the cameras would be captured at the pixels having identical vertical and horizontal coordinates in the two images 804 and 806. As that point of reference gets closer to the cameras, the vertical coordinates of the corresponding pixels will remain the same relative to each camera, but the horizontal coordinates of the corresponding pixels will begin to offset. For many objects captured in the physical environment that are not extremely close to the cameras, this offset may be no more than a few pixels in either direction. Accordingly, in some embodiments, the multiple pixels 836 in the second image 806 may include a particular number of pixels (e.g., approximately 10) to the left and/or right of a particular pixel in the second image 806 having the same pixel coordinate as the first pixel 834 in the first image 804. In other words, in such a stereoscopic configuration, an assumption can be made that a first pixel 834 in the first image 824 corresponds to the same point of reference as one of a plurality of pixels 836 along the same row and within a particular number of pixels at the same pixel coordinate in the second image 806. Similarly, even if correspondence is not an issue, an assumption can be made that a relevant photometric value can be found in a neighboring pixel (e.g., any of the plurality of pixels 836, 837), based on an assumption that the world is generally smooth and that neighboring pixels in an image should have relatively close photometric values.

Returning to FIG. 5B, process 500b continues at step 506b with calculating a plurality of photometric error values based on a difference between the photometric value of the first pixel 834 in the first image 804 and each of the plurality of photometric values of the plurality of pixels 836, 837 in the second image 806. For example, in FIG. 8A, the plurality of pixels 836 specifically includes seven pixels each with an associated photometric value. In this example, step 506b would include calculating seven photometric error values based on a difference between the first pixel 834 in the first image 804 and each of the seven pixels 836 in the second image 806. Again, this photometric error value may simply be an absolute difference between the photometric value of the first pixel in the first image 804 and the photometric values of the plurality of pixels in the second image 806. In other embodiments, the photometric error value may be weighted or adjusted based on any number of factors such as location in the image, lighting conditions, photometric values of adjacent pixels, etc. For example, in some embodiments, a photometric value of a given pixel in the second image may impact how the photometric value of a neighboring pixel in the second image is compared to a pixel in the first image.

Returning to FIG. 5B, process 500b continues at step 508b with determining a particular photometric error value based on the plurality of photometric error values calculated at step 506b. Specifically, in some embodiments, step 508b includes identifying the minimum photometric error value of the plurality of photometric error values calculated at step 506*b* and outputting that minimum photometric error value as the particular photometric error value for use in determining if an optical discrepancy exists. The minimum photometric error value may be used for a number of reasons. For example, the minimum photometric error value results from multiple pixels that have the closest photometric values which in many cases suggests that those two pixels directly correspond to the same point of reference in the physical environment. Further, using the minimum photometric error values may alleviate the tendency of digital noise to lead to false detection of optical discrepancies. Using the minimum photometric error value represents one way of determining a particular photometric error value for a given pixel pair, but is not to be construed as limiting. Depending on the requirements of a given implementation, other techniques may be applied. For example, instead of taking the minimum photometric error value, some embodiments may take the average, median, or maximum photometric error value. In some embodiments, the photometric error value derived from the plurality of photometric error values may be weighted or adjusted based on any number of factors such as location in the image, lighting conditions, photometric values of adjacent pixels, etc.

The above described processes 500*a* and 500*b* are performed for some or all of the pixels in a given image. For example, if the first image 804 is the baseline image and is processed with respect to the second image 806, the above described processes 500*a* or 500*b* may be performed for each of the pixels in the baseline image 804. In the case of a stereo image pair, the baseline image may be the right image or the left image. In some embodiments, to conserve processing resources, the above described processes 500*a* or 500*b* may be performed on only a subset of the pixels in the baseline image (e.g., every other row of pixels).

The above described processes for analyzing photometric values are examples provided for illustrative purposes. It shall be appreciated that other types of processes for comparing corresponding images may be applied overall and/or on a per pixel basis while remaining within the scope of the present disclosure.

Figure 9:
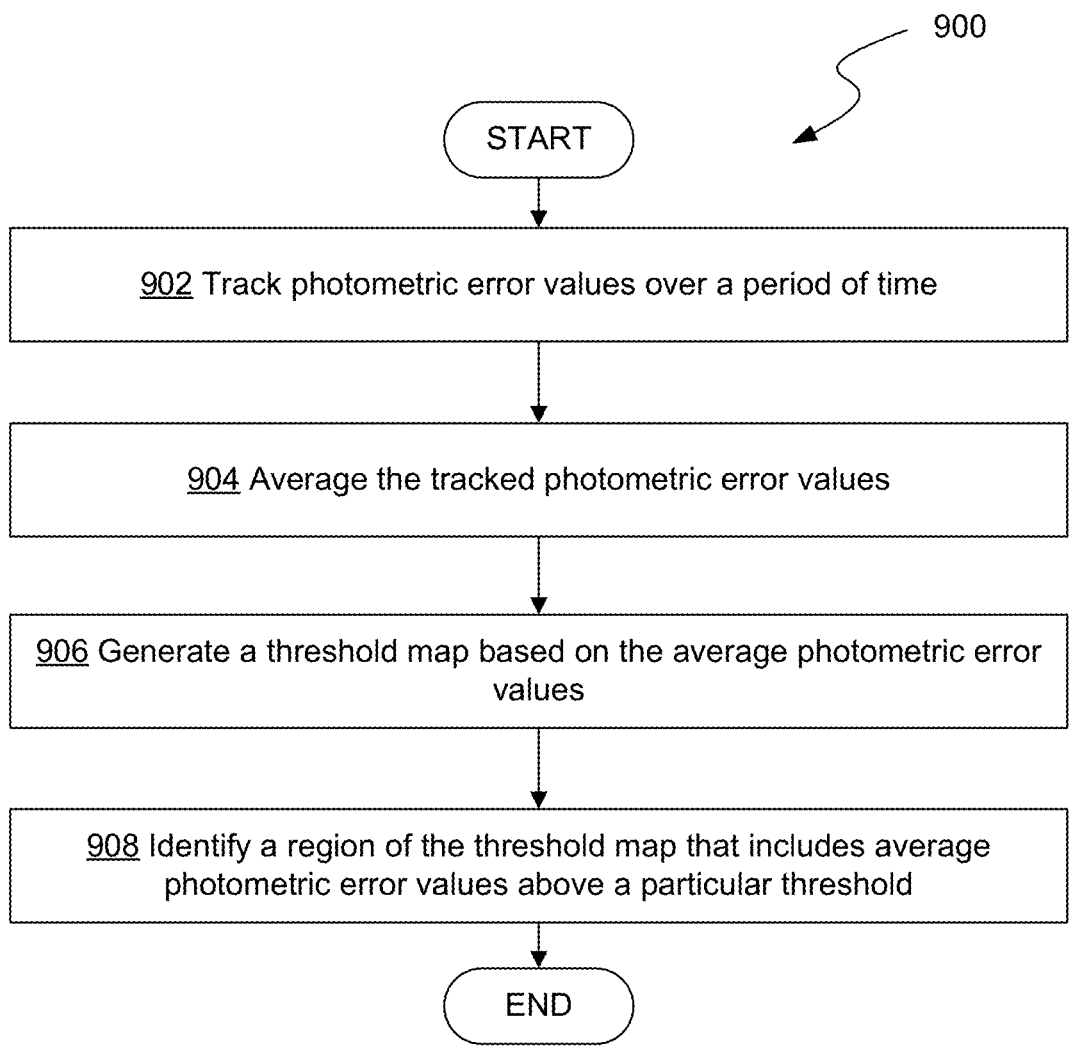
FIG. 9 shows a flow chart of an example process for detecting an optical discrepancy by generating a threshold map.

FIG. 9 is a flow chart describing an example process 900 for detecting an optical discrepancy by generating a threshold map based on the photometric error values calculated at processes 500*a* or 500*b*. One or more steps of the example process 900 may be performed by any one or more of the components of the example processing systems described with respect to FIG. 16 or 17. As previously mentioned, some or all of example process 900 may represent a subprocess performed at step 408 in example process 400 described above. The process 900 described with respect to FIG. 9 is an example provided for illustrative purposes and is not to be construed as limiting. Other processes may include more or fewer steps than depicted while remaining within the scope of the present disclosure. Further, the steps depicted in example process 900 may be performed in a different order than as shown.

Process 900 begins at step 902 with tracking photometric error values over a period of time. For example, a photometric error value may be calculated for each frame in a video feed from a camera or otherwise at some other regular or irregular interval. Again, this step may be performed for all or some of the pixels in the baseline image (e.g., the left image or right image in a stereoscopic embodiment). As time passes, motion by any of the image capture device or objects in the physical environment will tend to cause fluctuations in the calculated photometric error values for a given image. Accordingly, in some embodiments, these tracked photometric error values are averaged at step 904. Again, taking the average represents one way to generate the threshold map. Depending on the requirements of the particular implementation, the threshold map may alternatively be based on the minimum, maximum, median, etc. of the tracked photometric error values.

The period of time over which photometric error values are averaged can differ. In some embodiments, the tracked photometric error values are periodically averaged at fixed intervals (e.g., every 10 seconds). In some embodiments, the tracked photometric error values may be averaged only after certain conditions are met. For example, the tracked photometric error values may be averaged only after the associated cameras have met a minimum motion condition (e.g., minimum distance traveled, minimum rotation, etc.).

Figure 10:
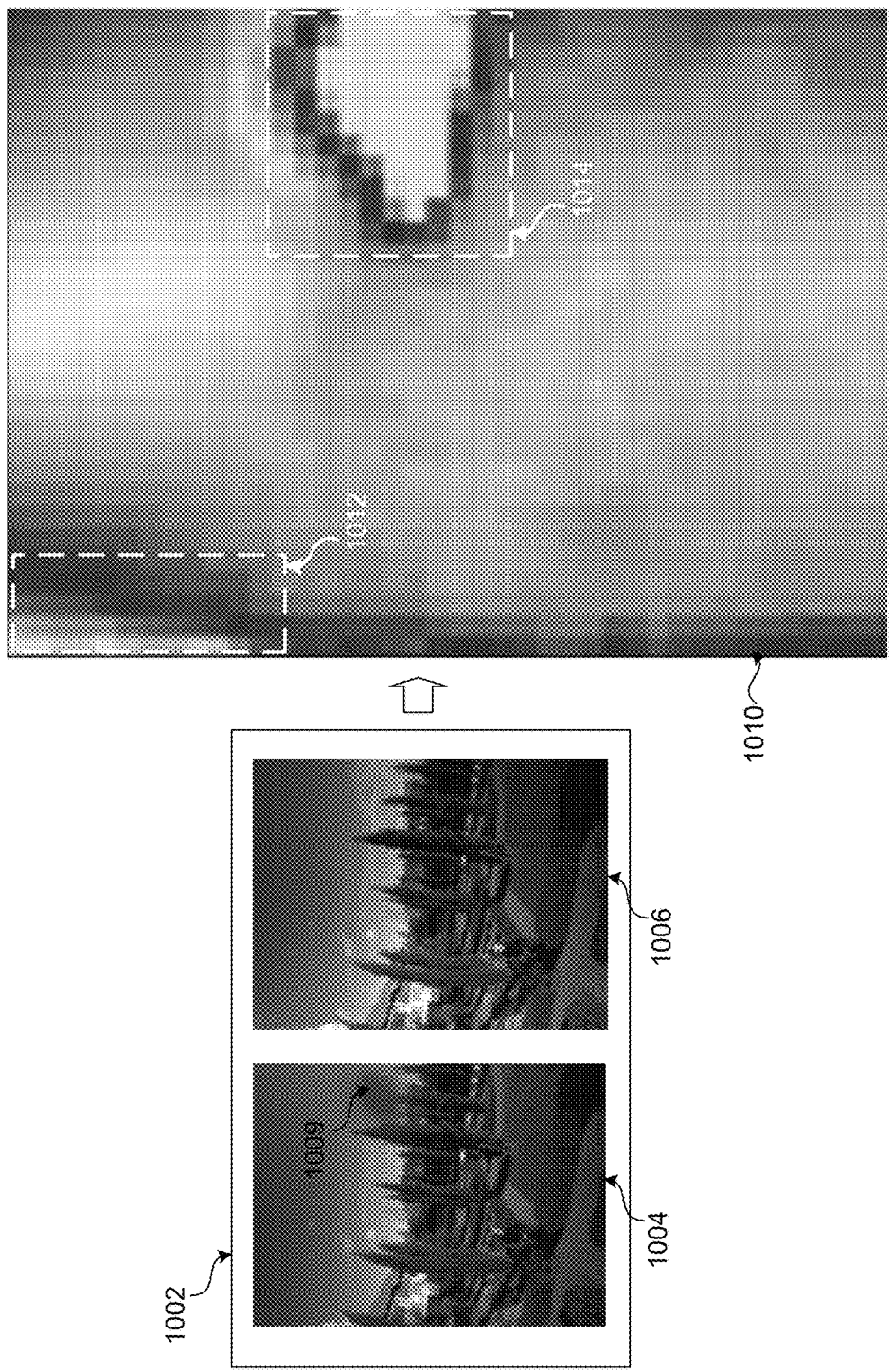
FIG. 10 shows an example threshold map.

Once a sufficient number of photometric error value calculations are made and averaged, the average values are thresholded to, at step 906, generate a threshold map. FIG. 10 shows an example threshold map 1010 that may result from the processing of a stereo image pair 1002 including a first image 1004 and second image 1006. The first image 1004 and second image 1006 may be the same as the example images 160 and 162 previously shown with respect to FIG. 1. As shown in FIG. 10, the resulting threshold map displays an array of average photometric error values that represent the photometric error values associated with each pixel (or at least a subset of the pixels) of a baseline image. In this example, the baseline image may be the first image 1004 (i.e., the left image) in the stereo pair 1002, but the baseline may be set to any of the multiple images being processed together. Each of the pixels having an associated average photometric error value will fall within one of several thresholds associated with a given threshold scheme. In an embodiment, the threshold ranges may be color coded. For example, blue may represent the lowest set of average photometric error values and red may represent the highest set of average photometric error values, with green, yellow, orange, etc. representing intermediate threshold ranges.

The resulting threshold map of the field of view of the baseline image can then be used at step 908 to identify regions that include average photometric error values that fall above a particular threshold. For example, as shown in FIG. 10, the threshold map 1010 can be used to identify regions 1012 and 1014 that exhibit average photometric error values above a particular threshold. These regions of relatively high average photometric error can, in some cases, indicate an optical discrepancy between a first baseline image (e.g., image 1004) and one or more other images (e.g., image 1006). For example, the region 1014 of relatively high average photometric error values corresponds with the optical discrepancy 1009 that may perhaps be caused by a smudge on a lens of a camera capturing image 1004. Note that the particular threshold used to identify these regions can differ depending on the requirements of a given implementation. In some embodiments, the particular threshold may be a fixed value. Alternatively, the particular threshold may delineate a particular percentile (e.g., top 25th percentile) of calculated average photometric error values over a given time period. The particular threshold used can also change over time depending on the situation. For example, in some situations, to reduce false positive identifications of optical discrepancies (e.g., during certain flight maneuvers by a UAV), the particular threshold may be raised.

In some embodiments, the process of identifying an optical discrepancy can include applying one or more machine learning models to identify regions in an image indicative of the optical discrepancy. For example, in an embodiment, machine learning models can be applied using a dataset generated using non-learning methods or from manually labeling previously identified regions having characteristics known to indicate an optical discrepancy.

Identifying a Cause of the Optical Discrepancy

As previously mentioned with respect to the example process 400 of FIG. 4, in some embodiments, a process may be applied to identify a cause of a detected optical discrepancy. Specifically, this process may involve analyzing a characteristic of an identified region in a generated threshold map that includes relatively high average photometric error values. In this context, a "characteristic" of an identified region can include a shape of the identified region, a size of the identified region, a location of the identified region in the threshold map, a duration of the identified region, or any other characteristic that may be indicative of a particular cause.

Figure 11:
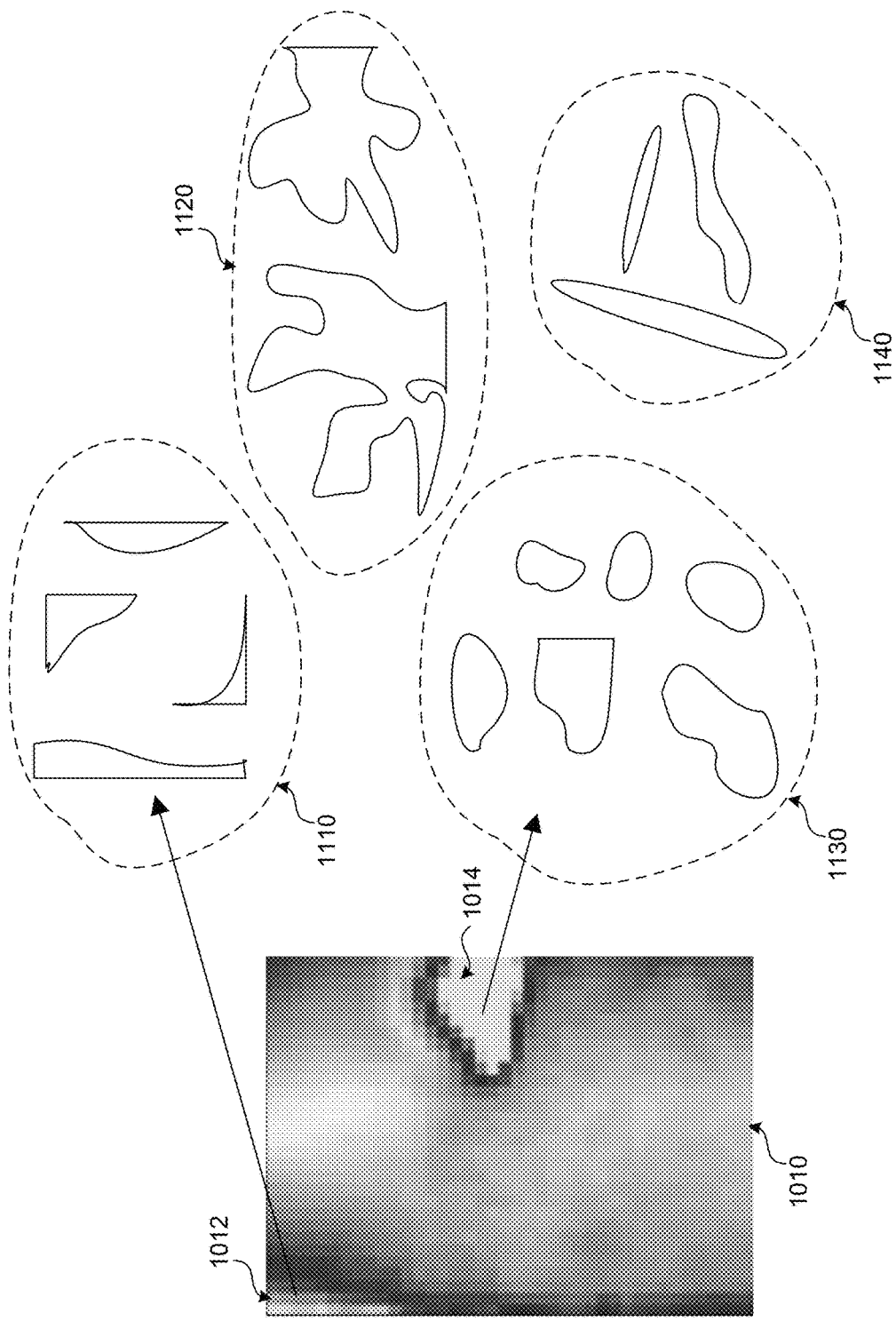
FIG. 11 shows a diagram illustrating an example process for determining a cause of detected optical discrepancy by analyzing a generated threshold map.

FIG. 11 illustrates how certain characteristics such as shape, size, location, etc. can be used to classify a particular identified region in a threshold map as belonging to a category associated with a particular cause. Consider, for example, the threshold map 1010 of FIG. 10 including the identified region 1014. By analyzing certain characteristics of the identified region 1014 it may be determined that the identified regions is more closely associated with category 1130 than other categories 1110, 1120, or 1140. In this example, identified regions having characteristics most closely associated with category 1130 may be indicative of a smudge, drop of water, etc. on a lens of a camera due to the relatively round shape. Conversely, category 1140, including relatively oblong shapes, may be indicative of a scratch on a lens of a camera. Category 1120, including relatively non-uniform shapes, may be indicative of a scratch on a lens. Category 1110, including shapes existing at corners or along edges of an image, may be indicative of a calibration issue. In any case, the categories 1110, 1120, 1130, and 1140 depicted in FIG. 11 are just examples and are not to be construed as limiting. Other embodiments may include more or fewer categories of causes of an optical discrepancy.

The process of analyzing characteristics of identified regions in a threshold map can include applying one or more supervised or unsupervised machine learning models to classify those characteristics as indicative of one or more of a plurality of possible causes of the optical discrepancy. In some embodiments, appearance models may be represented in a trained neural network that utilizes deep learning to classify detected regions based on certain characteristics.

Generating an Image Mask Based on the Optical Discrepancy

Figure 12:
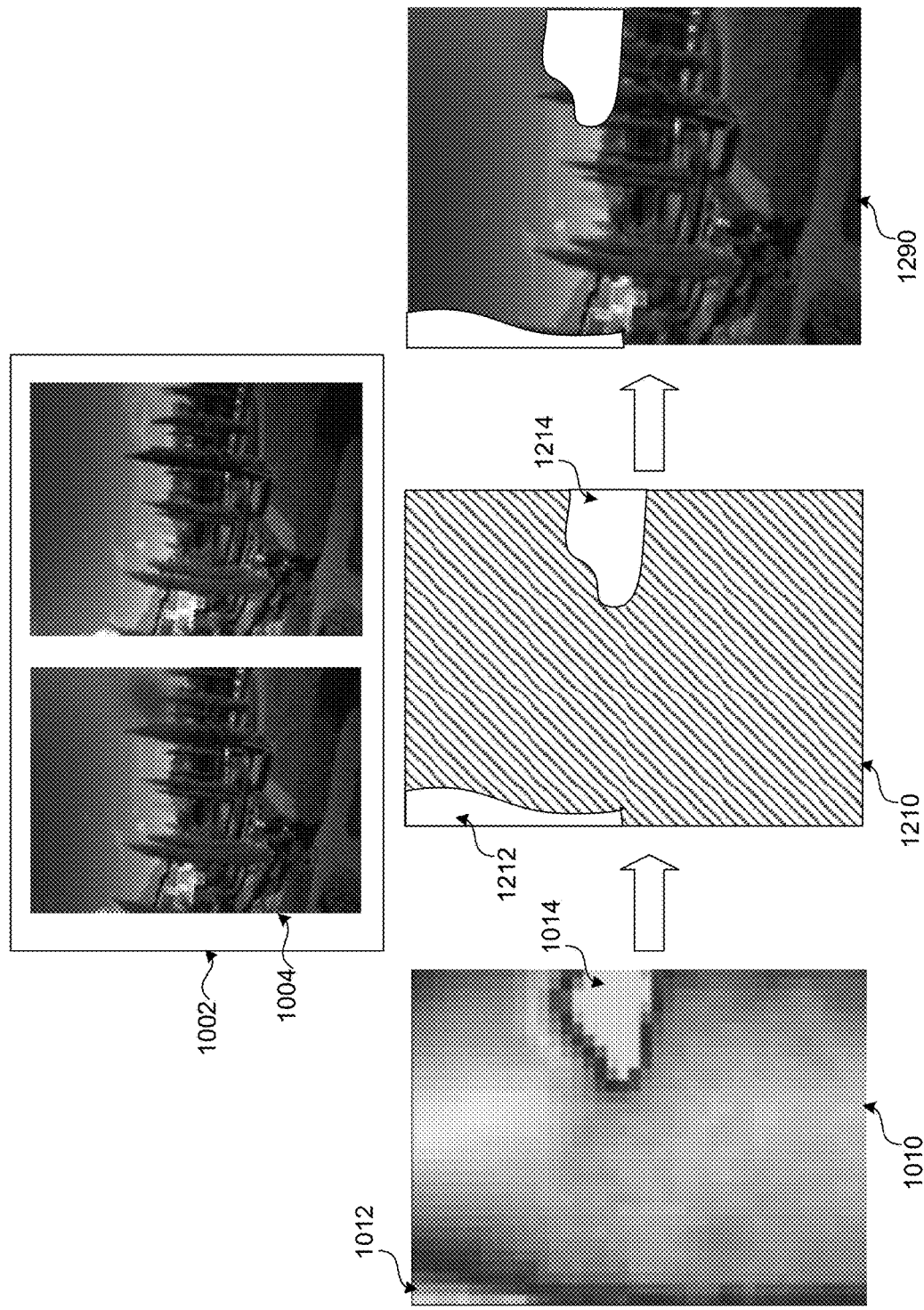
FIG. 12 shows a diagram illustrating an example process for generating an image mask based on a threshold map.

FIG. 11 illustrates the generation of an image mask based on a detected optical discrepancy. An image mask may be utilized, for example, to inform a visual navigation system of regions in an image that may include unreliable information due to an optical discrepancy. In other embodiments, an image mask may be utilized to set boundaries within which an image is manipulated to correct for detected anomalies. As shown in FIG. 12, an image mask 1210 associated with a set of images (e.g., the stereo pair 1002 of FIG. 10) may be generated based on the threshold map (e.g., the threshold map 1010 of FIG. 10). As shown in FIG. 12, the image mask 1210 includes regions 1212 and 1214 that correspond with the identified regions 1012 and 1014 (respectively) of relatively high average photometric error in the threshold map 1010. The image mask 1210 can then be applied to, overlaid, composited, or otherwise combined with the underlying image (e.g., the left image 1004 of stereo pair 1002) exhibiting the optical discrepancy so as to produce an image 1290 that masks out the optical discrepancy. A generated image mask for a given image may be continually updated based on changes in the threshold map at regular or irregular intervals. Depending on the intended use of the image this masking out of the optical discrepancy may alleviate the effect of the optical discrepancy.

Note that, for illustrative purposes, the image mask 1210 is depicted in FIG. 12 as a visual element that is then overlaid on a captured image 104. However, in some cases, an image mask may simply comprise a binary instruction, for example, to a visual navigation system, to either process a pixel at a particular pixel coordinate or to ignore that pixel. In other words, the process of "applying" the image mask 1210 to the underlying image 1004 may not actually involve adjusting the underlying image 1210 (e.g., through compositing).

Adjusting the Captured Images to Correct for the Optical Discrepancy

Figure 13:
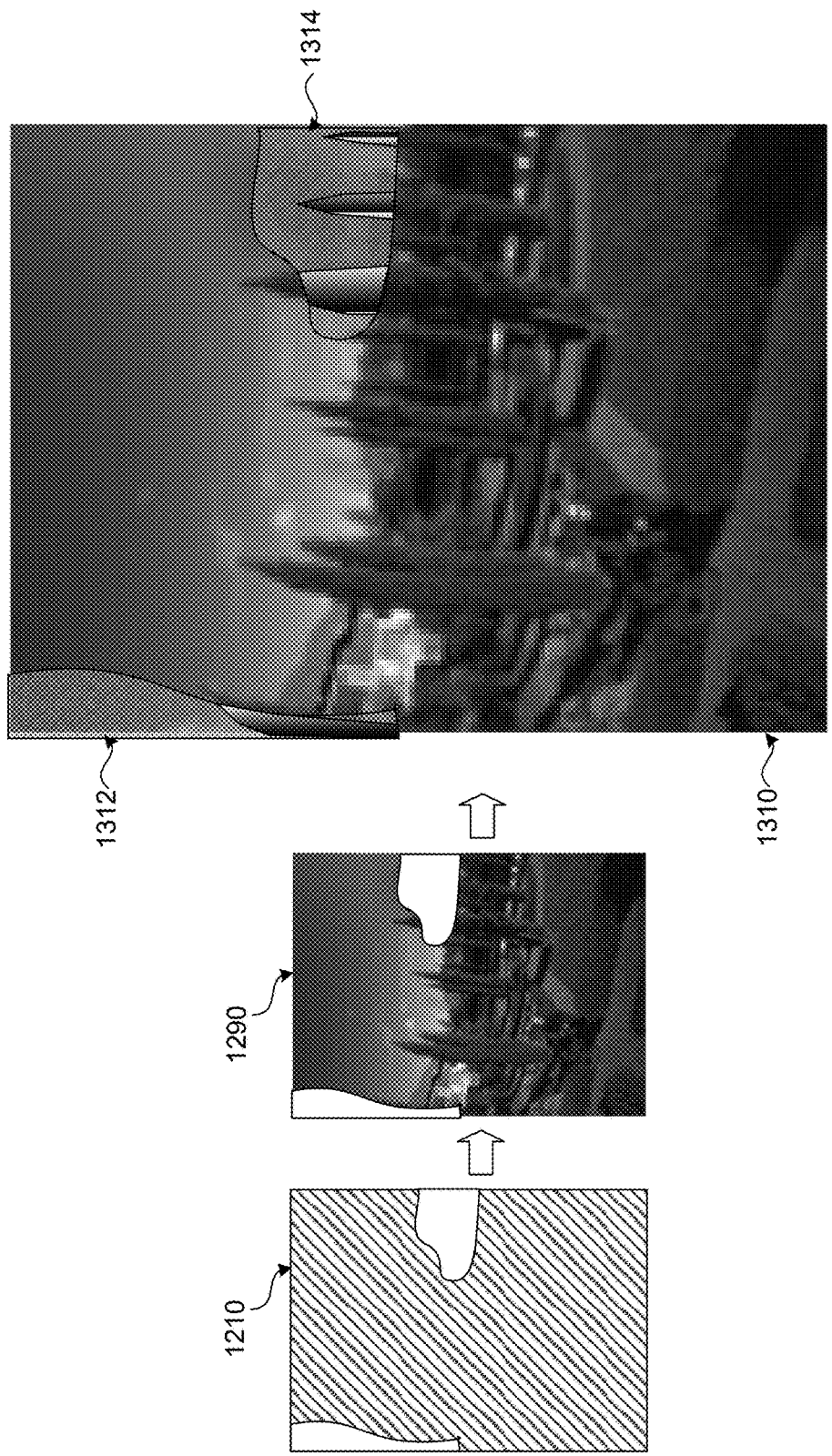
FIG. 13 shows a diagram illustrating an example process for adjusting an image to correct for a detected optical discrepancy.

FIG. 13 illustrates an example process for adjusting captured images to correct for a detected optical discrepancy. As shown in FIG. 13, the generated image mask 1210 defines region boundaries within which adjustments can be applied to correct for certain optical discrepancies. FIG. 13 shows a composite image 1310 that includes adjusted regions 1312 and 1314 based on an underlying image mask 1210. As shown, the adjusted regions include composited image data that in effect fills in the masked out portions. The composited image data filling in the masked portions may include interpolated image data based, for example, on photometric data of pixels surrounding the masked portion. In situations where interpolation is impractical, data from other sensors may be applied to generate images to fill in the masked portion. For example, data from another corresponding camera can be composited with the underlying image to fill in the masked out portions (e.g., as shown at image 1310). Alternatively, or in addition, data from other types of sensors (e.g., range finding sensors) can be processed to generate images of objects falling within the masked out portions. These computer generated images can similarly be composited to fill in the masked out portions of an underlying image.

Integration with an Autonomous Vehicle

As previously discussed, a vehicle (e.g., UAV 100) may be configured for autonomous flight by applying visual odometry to images captured by one or more image capture devices associated with the vehicle. Again, the following is described with respect to UAV 100 for illustrative purposes; however, the described techniques may be applied to any type of autonomous vehicle. Additional information regarding visual odometry is described with respect to FIG. 15. Further processes are in place, described below as being performed by a "visual navigation system," for illustrative purposes. However, any one or more of the described processes may be performed by one or more of the components of the processing systems described with respect to FIGS. 16 and 17.

Optical discrepancies associated with the image capture will inevitably impact the ability of a navigation system to generate control commands to effectively guide the UAV 100 through a physical environment while avoiding obstacles. For example, a smudge on a lens of an image capture device may cause an optical discrepancy that appears to a visual navigation system to be an obstacle in the physical environment. Accordingly, several measures can be taken to alleviate the effects of such optical discrepancies on autonomous navigation. One or more of the below described techniques for alleviating the effects of optical discrepancies can be performed by a computer processing system, for example, the systems described with respect to FIGS. 16 and 17. One or more of the below described techniques may be performed automatically in response to detecting an optical discrepancy or in response to a user input, for example, transmitted from a remote computing device (e.g., mobile device 104) via a wireless communication link.

In some embodiments, a visual navigation system may be configured to simply ignore image data falling within an unreliable portion of a captured image. Consider again the threshold map 1010 described with respect to FIG. 10. An example process may include first determining that an identified region of the threshold map that includes average photometric error values above the particular threshold is indicative of an unreliable portion of an image. In response to determining that the identified region is unreliable, the example process continues with generating an image mask based on the threshold map, for example, as described with respect to FIG. 11. The image mask is applied (i.e., overlaid, composited, etc.) to the captured image(s) such that a visual navigation system ignores the unreliable portion. For example, a captured image with an applied mask (e.g., similar to image 1290 in FIG. 12) may be processed by a visual navigation system using computer vision techniques to guide the UAV 100 through the physical environment. The portions of the image with the applied mask may be ignored, for example, by setting all estimated depth values for the portion to be effectively infinite. Alternatively, as previously described, the image mask may simply comprise a binary instruction to either process a pixel at a particular pixel coordinate or to ignore that pixel. In other words, by applying an image mask based on the threshold map, a visual navigation system may ignore pixels falling within an unreliable portion of a captured image.

Alternatively, in some embodiments, the masked portions of an image can be supplemented with more reliable data for performing depth estimations. For example, depth estimates may be based on data received from range finding sensors such as light detection and ranging (LIDAR) onboard UAV 100. Similarly, captured images may be adjusted by compositing supplemental image data within the boundaries of the masked portions using any of the above described techniques. For example, before supplying received images to a visual navigation system, the received images can be processed and adjusted to correct for any detected optical discrepancies.

In some embodiments, an image capture device associated with a UAV 100 may include automated systems configured to remedy certain optical discrepancies. For example, an image capture device may include an automated lens cleaning system. An automated lens cleaning system may include any of wipers, blowers, sprayers, apertures, etc. that can be used to automatically clean the lens of a camera. Such a system can be automatically operated in response to detecting an optical discrepancy.

If the detected optical discrepancies are relatively severe (e.g., in the case of a cracked lens), a visual navigation system may automatically ignore any signals received from a camera causing the discrepancy in response to detecting the discrepancy. As previously described, a visual navigation system can be configured to guide a UAV 100 using images from a single camera. Accordingly, in an embodiment including two or more cameras, it may be preferable to ignore signals from a camera that is having issues than to base navigation decisions on unreliable information. In such an embodiment, the camera that is having issues may be automatically powered down in order to conserve power. In many situations, reducing the amount of data available to a navigation system of an autonomous vehicle may not be ideal. Accordingly, UAV 100 may wait until the optical discrepancy is confirmed (e.g., after executing certain maneuvers described below) or until the detected optical discrepancy has persisted for a particular period of time (e.g., 1 minute) before electing to ignore or power down a camera.

In some situations, the detected optical discrepancies may be so severe that autonomous navigation based on received images is no longer practical. In such situations, a navigation system associated with the UAV 100 may automatically take one of several actions. If the UAV 100 is equipped with backup navigation systems that do not rely on captured images (e.g., non-visual inertial navigation, GPS, range based navigation, etc.), the UAV 100 may simply revert to autonomous navigation using those systems. If backup systems are not available, or not capable of autonomous navigation, the UAV 100 may alternatively automatically revert to direct or indirect control by a user, for example, based on control signals received from a remote computing device (e.g., a mobile device 104) via a wireless connection. In such an embodiment, the UAV 100 may first notify a user, for example, via a notification at remote device, that control will be transferred back to the user. If controlled flight is not practical, either autonomously or through control by a user, a control system associated with the UAV 100 may instead generate control commands configured to cause the UAV 100 to automatically land as soon as possible or stop an maintain a hover until control can be restored. In this case of a ground based automated vehicle such as a car, a similar action may include pulling over to a shoulder or stopping in place.

A detected optical discrepancy can be caused by a number of factors including objects in the physical environment occluding the view of one or more of the cameras of an image capture device. To confirm that a detected optical discrepancy is associated with an image capture issue and not an occluding object, a detected optical discrepancy may be tracked over a period of time while continually changing the position and/or orientation of the image capture device. If the optical discrepancy is associated with an image capture issue, the optical discrepancy will be expected to persist and remain relatively uniform independent of any changes in the position and/or orientation of the image captured device. Accordingly, in some embodiments, in response to detecting an optical discrepancy a processing system may cause the UAV 100 to maneuver to adjust a position and/or orientation of a coupled image capture device. The system will continue to process images (e.g., according to the example process 400 in FIG. 4) captured during these maneuvers to confirm the detected optical discrepancy.

Example Outputs Indicative of the Optical Discrepancy

Various outputs indicative of detected optical discrepancies can be generated and output to a user. FIGS. 14A-14D show several example outputs that may be generated and displayed to a user via a display 14061406 of a computing device 1404 (e.g., a smart phone). The computing device 1404 depicted in FIGS. 14A-14B may be any type of device and may include one or more of the components described with respect to system 1700 in FIG. 17. Any one or more of the outputs shown in FIGS. 14A-14D may be generated at the computing device 1404 and/or at a remote computing device (e.g., a server device) communicatively coupled to the computing device 1404 via a computer network.

Figures 14A, 14B:
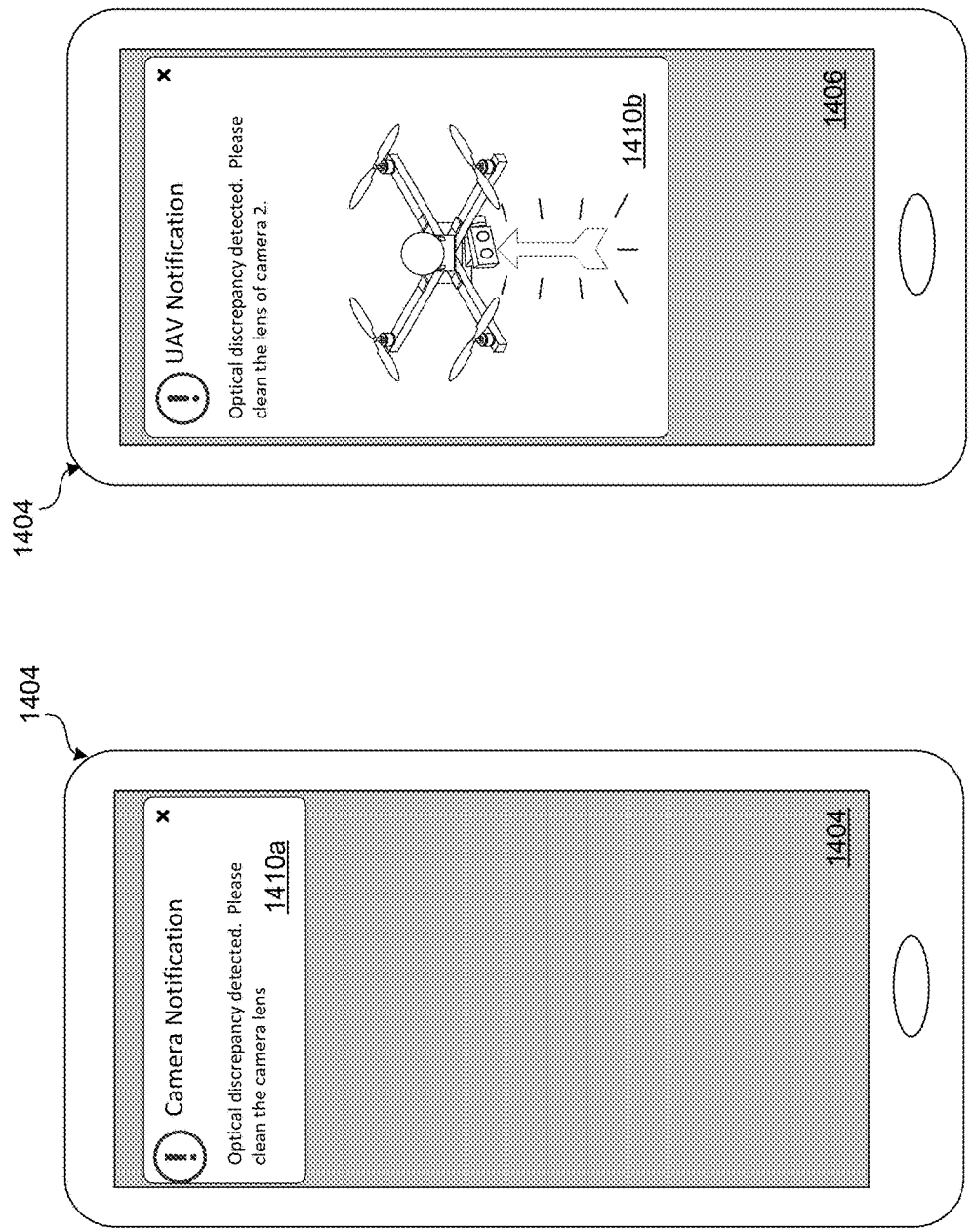

FIG. 14A shows an example output in the form of a text-based notification 1410a. Text based notification may be transmitted via a computer network or via any of one or more communications protocols (e.g., email protocols, SMS, etc.). The text-based notification 1410a shown in FIG. 14A may be generated and output to a user in response to detection of an optical discrepancy. The text-based notification 1410a may include information associated with the detected optical discrepancy, recommended actions for remedying the issue, interactive options for remedying the issue, or any other information that may be relevant to the detected optical discrepancy. For example, notification 1410a simply informs the user that an optical discrepancy has been detected and suggests that the user clean the lens of the camera.

FIG. 14B shows an example output in the form of a notification 1410b that includes graphical elements. Notification 1410b is similar to notification 1410a but includes additional information in the form of a graphical representation of the UAV 100 and associated image capture device as well as specific instructions to clean one of several cameras that are causing the optical discrepancy. As shown in FIG. 14B, the example notification includes an arrow directing the user's attention to the camera causing the optical discrepancy.

FIG. 14C shows an example output in the form of a notification 1410c that includes a display of a threshold map 1412 upon which the detected optical discrepancy is based. The threshold map 1412 in this example may be similar to the threshold map 1010 of FIG. 10. Although not shown in FIG. 14C, the example notification 1412 may include additional information including data and analysis associated with the regions of relatively high average photometric error.

FIG. 14D shows an example output in the form of an adjusted image 1490. For example, the adjusted image 1490 may represent a composite image generated to correct a detected optical discrepancy, for example, as described with respect to FIG. 12. The example output 1490 depicted in FIG. 14D may be an adjusted live video feed from an image capture device onboard a UAV 100. Alternatively, the example output 1490 may be a video feed from a camera of computing device 1404 displayed, for example, via a camera application instantiated at the device 1404. The example adjusted image 1490 may also be displayed post image capture, for example, via an image/video viewing or editing application instantiated at the computing device 1404.

Autonomous Navigation by a Vehicle Based on Visual Sensor Data

Figure 15:
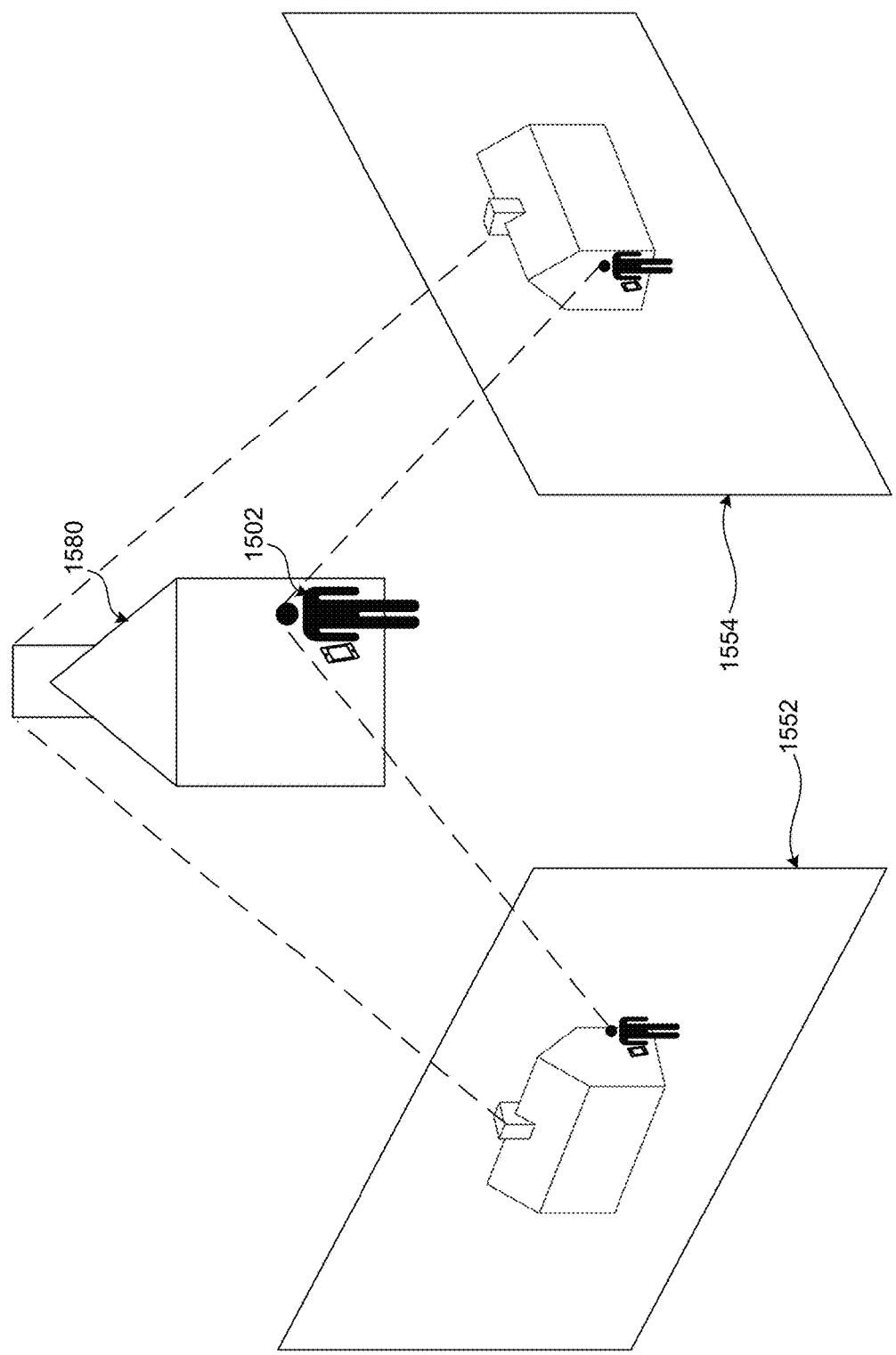
FIG. 15 shows a diagram illustrating the concept of visual odometry based on captured images.

As previously discussed, visual navigation systems can be configured to guide an autonomous vehicle such as a UAV 100 based on images captured from an image capture device. Using a visual odometry or visual inertial odometry, captured images are processed to produce estimates of the position and/or orientation of the camera capturing the images. FIG. 15 illustrates the working concept behind visual odometry at a high level. A plurality of images are captured in sequence as an image capture device moves through space. Due to the movement of the image capture device, the images captured of the surrounding physical environment change from frame to frame. In FIG. 15, this is illustrated by initial image capture field of view 1552 and a subsequent image capture field of view 1554 captured as the image capture device has moved from a first position to a second position over a period of time. In both images, the image capture device may capture real world physical objects, for example, the house 1580 and/or the human subject 1502. Computer vision techniques are applied to the sequence of images to detect and match features of physical objects captured in the field of view of the image capture device. For example, a system employing computer vision may search for correspondences in the pixels of digital images that have overlapping fields of view (FOV). The correspondences may be identified using a number of different methods such as correlation-based and feature-based methods. As shown in, in FIG. 15, features such as the head of a human subject 1502 or the corner of the chimney on the house 1580 can be identified, matched, and thereby tracked. By incorporating sensor data from an IMU (or accelerometer(s) or gyroscope(s)) associated with the image capture device to the tracked features of the image capture, estimations may be made for the position and/or orientation of the image capture device over time. Further, these estimates can be used to calibrate various positioning systems, for example, through estimating differences in camera orientation and/or intrinsic parameters (e.g., lens variations)) or IMU biases and/or orientation. Visual odometry may be applied at both the UAV 100 and mobile device 104 to calculate the position and/or orientation of both systems. Further, by communicating the estimates between the systems (e.g., via a Wi-Fi connection) estimates may be calculated for the respective positions and/or orientations relative to each other. Position and/or orientation estimates based in part on sensor data from an on board IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, systems in accordance with the present teachings may simultaneously generate a 3D map of the surrounding physical environment while estimating the relative positions and/or orientations of the UAV 100 and/or objects within the physical environment. This is sometimes referred to simultaneous localization and mapping (SLAM). In such embodiments, using computer vision processing, a system in accordance with the present teaching can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

According to some embodiments, computer vision may include sensing technologies other than image capture devices (i.e., cameras) such as LIDAR. For example, a UAV 100 equipped with LIDAR may emit one or more laser beams in a continuous scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may, in some embodiments, augment depth sensing through pixel correspondence as described earlier. Such 3D models may be analyzed to identify particular physical objects (e.g., subject 102) in the physical environment for tracking. Further, images captured by cameras (e.g., as described earlier) may be combined with the laser constructed 3D models to form textured 3D models that may be further analyzed in real time or near real time for physical object recognition (e.g., by using computer vision algorithms).

Unmanned Aerial Vehicle—Example System

A UAV 100, according to the present teachings, may be implemented as any type of unmanned aerial vehicle. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along means for propulsion (e.g., propeller, jet) to achieve lift. Alternatively, similar to helicopters, UAVs may directly use the their means for propulsion (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axis.

Multi-rotor helicopters, in particular quadcopters, have emerged as a popular UAV configuration. A quadcopter (also known as a quadrotor helicopter or quadrotor) is a multirotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, the a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on horizontal plane.

Figure 16:
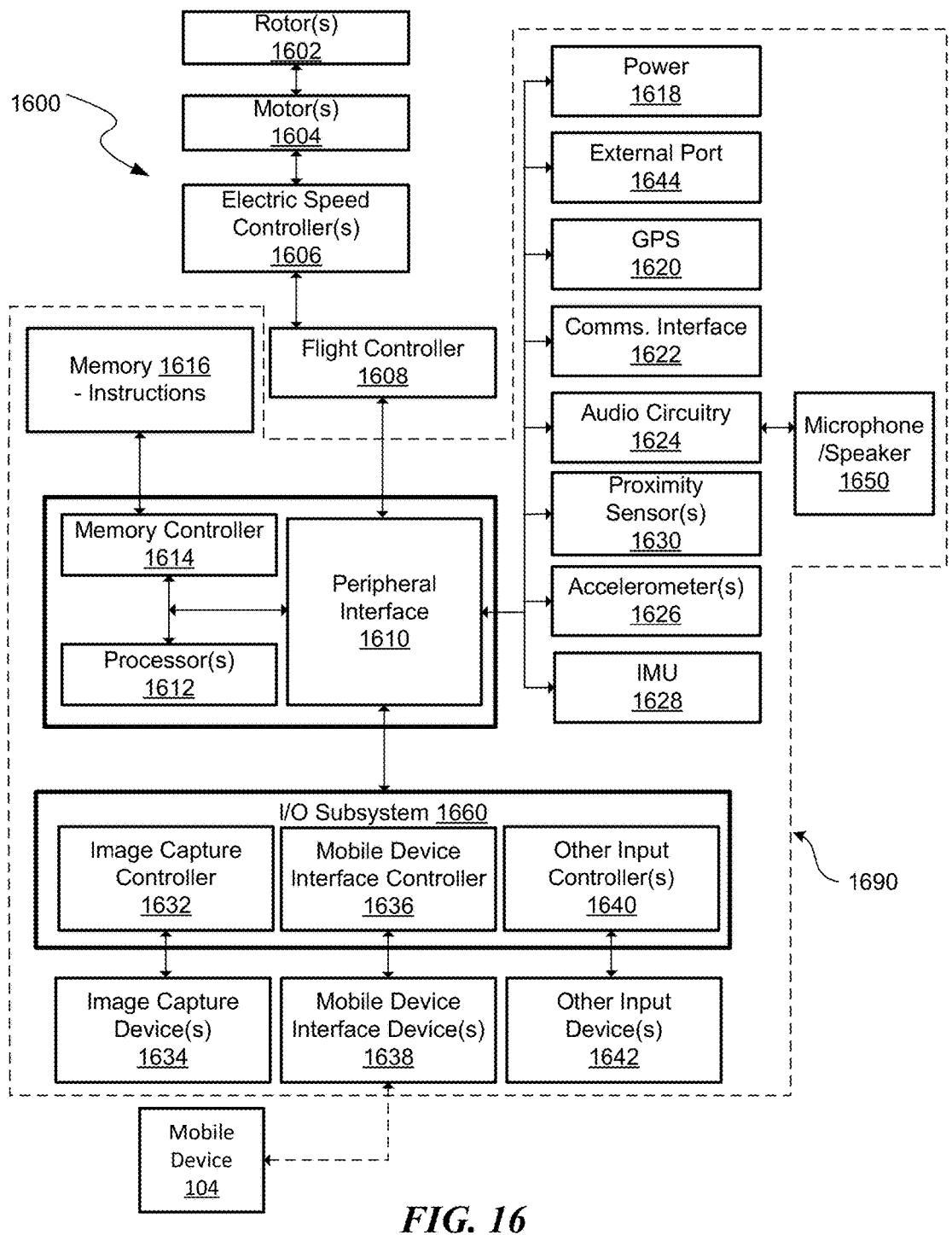
FIG. 16 shows a diagram of an example system associated with a UAV in which at least some operations described in this disclosure can be implemented.

FIG. 16 shows a diagram of an example UAV system 1600 including various functional system components that may be part of a UAV 100, according to some embodiments. UAV system 1600 may include one or more means for propulsion (e.g., rotors 1602 and motor(s) 1604), one or more electronic speed controllers 1606, a flight controller 1608, a peripheral interface 1610, a processor(s) 1612, a memory controller 1614, a memory 1616 (which may include one or more computer readable storage media), a power module 1618, a GPS module 1620, a communications interface 1622, an audio circuitry 1624, an accelerometer 1626 (including subcomponents such as gyroscopes), an inertial measurement unit (IMU) 1628, a proximity sensor 1630, an optical sensor controller 1632 and associated optical sensor(s) 1634, a mobile device interface controller 1636 with associated interface device(s) 1638, and any other input controllers 1640 and input device 1642, for example, display controllers with associated display device(s). These components may communicate over one or more communication buses or signal lines as represented by the arrows in FIG. 16.

UAV system 1600 is only one example of a system that may be part of a UAV 100. A UAV 100 may include more or fewer components than shown in system 1600, may combine two or more components as functional units, or may have a different configuration or arrangement of the components. Some of the various components of system 1600 shown in FIG. 16 may be implemented in hardware, software or a combination of both hardware and software, including one or more signal processing and/or application specific integrated circuits. Also, UAV 100 may include an off-the-shelf UAV (e.g., a currently available remote controlled quadcopter) coupled with a modular add-on device (for example, one including components within outline 1690) to perform the innovative functions described in this disclosure.

As described earlier, the means for propulsion 1602-1604 may comprise a fixed-pitch rotor. The means for propulsion may also be a variable-pitch rotor (for example, using a gimbal mechanism), a variable-pitch jet engine, or any other mode of propulsion having the effect of providing force. The means for propulsion 1602-1604 may include a means for varying the applied thrust, for example, via an electronic speed controller 1606 varying the speed of each fixed-pitch rotor.

Flight Controller 1608 (sometimes referred to as a "flight control system," "autopilot," or "navigation system") may include a combination of hardware and/or software configured to receive input data (e.g., sensor data from image capture devices 1634), interpret the data and output control commands to the propulsion systems 1602-1606 and/or aerodynamic surfaces (e.g., fixed wing control surfaces) of the UAV 100. Alternatively or in addition, a flight controller 1608 may be configured to receive control commands generated by another component or device (e.g., processors 1612 and/or a separate computing device), interpret those control commands and generate control signals to the propulsion systems 1602-1606 and/or aerodynamic surfaces (e.g., fixed wing control surfaces) of the UAV 100.

Memory 1616 may include high-speed random access memory and may also include non-volatile memory, such as one or more magnetic disk storage devices, flash memory devices, or other non-volatile solid-state memory devices.

Access to memory 1616 by other components of system 1600, such as the processors 1612 and the peripherals interface 1610, may be controlled by the memory controller 1614.

The peripherals interface 1610 may couple the input and output peripherals of system 1600 to the processor(s) 1612 and memory 1616. The one or more processors 1612 run or execute various software programs and/or sets of instructions stored in memory 1616 to perform various functions for the UAV 100 and to process data. In some embodiments, processors 1312 may include general central processing units (CPUs), specialized processing units such as Graphical Processing Units (GPUs) particularly suited to parallel processing applications, or any combination thereof. In some embodiments, the peripherals interface 1610, the processor(s) 1612, and the memory controller 1614 may be implemented on a single integrated chip. In some other embodiments, they may be implemented on separate chips.

The network communications interface 1622 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 1624, including the speaker and microphone 1650 may provide an audio interface between the surrounding environment and the UAV 100. The audio circuitry 1624 may receive audio data from the peripherals interface 1610, convert the audio data to an electrical signal, and transmit the electrical signal to the speaker 1650. The speaker 1650 may convert the electrical signal to human-audible sound waves. The audio circuitry 1324 may also receive electrical signals converted by the microphone 1650 from sound waves. The audio circuitry 1624 may convert the electrical signal to audio data and transmit the audio data to the peripherals interface 1610 for processing. Audio data may be retrieved from and/or transmitted to memory 1616 and/or the network communications interface 1622 by the peripherals interface 1610.

The I/O subsystem 1660 may couple input/output peripherals of UAV 100, such as an optical sensor system 1634, the mobile device interface 1638, and other input/control devices 1642, to the peripherals interface 1610. The I/O subsystem 1660 may include an optical sensor controller 1632, a mobile device interface controller 1636, and other input controller(s) 1640 for other input or control devices. The one or more input controllers 1640 receive/send electrical signals from/to other input or control devices 1642.

The other input/control devices 1642 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1616) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

The mobile device interface device 1638 along with mobile device interface controller 1636 may facilitate the transmission of data between a UAV 100 and other computing device such as a mobile device 104. According to some embodiments, communications interface 1622 may facilitate the transmission of data between UAV 100 and a mobile device 104 (for example, where data is transferred over a local Wi-Fi network).

UAV system 1600 also includes a power system 1618 for powering the various components. The power system 1618 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 1600 may also include one or more image capture devices 1634. FIG. 16 shows an image capture device 1634 coupled to an image capture controller 1632 in I/O subsystem 1660. The image capture device 1634 may include one or more optical sensors. For example, image capture device 1634 may include a charge-coupled device (CCD) or complementary metal-oxide semiconductor (CMOS) phototransistors. The optical sensors of image capture device 1634 receive light from the environment, projected through one or more lens (the combination of an optical sensor and lens can be referred to as a "camera") and converts the light to data representing an image. In conjunction with an imaging module located in memory 1616, the image capture device 1634 may capture images (including still images and/or video). In some embodiments, an image capture device 1634 may include a single fixed camera. In other embodiments, an image capture device 1640 may include a single adjustable camera (adjustable using a gimbal mechanism with one or more axes of motion). In some embodiments, an image capture device 1634 may include a camera with a wide-angle lens providing a wider field of view. In some embodiments, an image capture device 1634 may include an array of multiple cameras providing up to a full 360 degree view in all directions. In some embodiments, an image capture device 1634 may include two or more cameras (of any type as described herein) placed next to each other in order to provide stereoscopic vision. In some embodiments, an image capture device 1634 may include multiple cameras of any combination as described above. In some embodiments, the cameras of image capture device 1634 may be arranged such that at least two cameras are provided with overlapping fields of view at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 1600 may also include one or more proximity sensors 1630. FIG. 16 shows a proximity sensor 1630 coupled to the peripherals interface 1610. Alternately, the proximity sensor 1630 may be coupled to an input controller 1640 in the I/O subsystem 1660. Proximity sensors 1630 may generally include remote sensing technology for proximity detection, range measurement, target identification, etc. For example, proximity sensors 1330 may include radar, sonar, and LIDAR.

UAV system 1600 may also include one or more accelerometers 1626. FIG. 16 shows an accelerometer 1626 coupled to the peripherals interface 1610. Alternately, the accelerometer 1626 may be coupled to an input controller 1640 in the I/O subsystem 1660.

UAV system 1600 may include one or more inertial measurement units (IMU) 1628. An IMU 1628 may measure and report the UAV's velocity, acceleration, orientation, and gravitational forces using a combination of gyroscopes and accelerometers (e.g., accelerometer 1626).

UAV system 1600 may include a global positioning system (GPS) receiver 1620. FIG. 16 shows an GPS receiver 1620 coupled to the peripherals interface 1610. Alternately, the GPS receiver 1620 may be coupled to an input controller 1640 in the I/O subsystem 1660. The GPS receiver 1620 may receive signals from GPS satellites in orbit around the earth, calculate a distance to each of the GPS satellites (through the use of GPS software), and thereby pinpoint a current global position of UAV 100.

In some embodiments, the software components stored in memory 1616 may include an operating system, a communication module (or set of instructions), a flight control module (or set of instructions), a localization module (or set of instructions), a computer vision module, a graphics module (or set of instructions), and other applications (or sets of instructions). For clarity one or more modules and/or applications may not be shown in FIG. 16.

An operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1644 and may also include various software components for handling data transmission via the network communications interface 1622. The external port 1644 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including without limitation text, still images, videos, animations, icons (such as user-interface objects including soft keys), and the like. The graphics module in conjunction with a graphics processing unit (GPU) 1612 may process in real time or near real time, graphics data captured by optical sensor(s) 1634 and/or proximity sensors 1630.

A computer vision module, which may be a component of graphics module, provides analysis and recognition of graphics data. For example, while UAV 100 is in flight, the computer vision module along with graphics module (if separate), GPU 1612, and image capture devices(s) 1634 and/or proximity sensors 1630 may recognize and track the captured image of a subject located on the ground. The computer vision module may further communicate with a localization/navigation module and flight control module to update a relative position between UAV 100 and a point of reference, for example, a target subject (e.g., a human subject 102), and provide course corrections to fly along a planned flight path relative to the point of reference.

A localization/navigation module may determine the location and/or orientation of UAV 100 and provides this information for use in various modules and applications (e.g., to a flight control module in order to generate commands for use by the flight controller 1608).

Image capture devices(s) 1634 in conjunction with, image capture device controller 1632, and a graphics module, may be used to capture images (including still images and video) and store them into memory 1616.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory

1616 may store a subset of the modules and data structures identified above. Furthermore, memory 1616 may store additional modules and data structures not described above.

Example Computer Processing System

Figure 17:
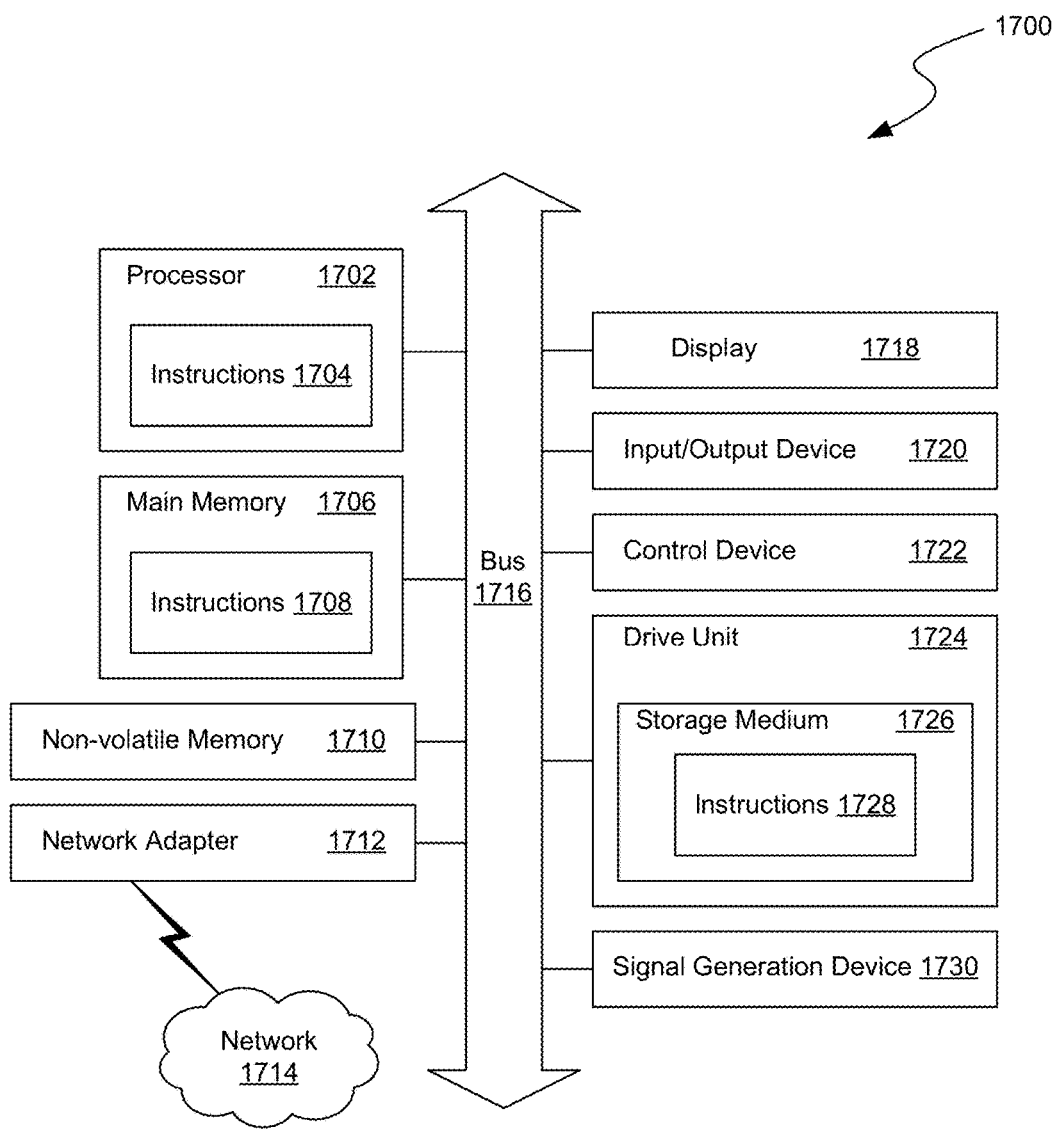
FIG. 17 shows a diagram of an example processing system in which at least some operations described in this disclosure can be implemented.

FIG. 17 is a block diagram illustrating an example of a processing system 1700 in which at least some operations described in this disclosure can be implemented. The example processing system 1700 may be part of any of the aforementioned devices including, but not limited to UAV 100, mobile device 104, and mobile device 1404. The processing system 1700 may include one or more central processing units ("processors") 1702, main memory 1706, non-volatile memory 1710, network adapter 1712 (e.g., network interfaces), display 1718, input/output devices 1720, control device 1722 (e.g., keyboard and pointing devices), drive unit 1724 including a storage medium 1726, and signal generation device 1730 that are communicatively connected to a bus 1716. The bus 1716 is illustrated as an abstraction that represents any one or more separate physical buses, point to point connections, or both connected by appropriate bridges, adapters, or controllers. The bus 1716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 1700 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1706, non-volatile memory 1710, and storage medium 1726 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1704, 1708, 1728) set at various times in various memory and storage devices in a computer, and that, when read and executed by one or more processing units or processors 1702, cause the processing system 1700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1712 enables the processing system 1700 to mediate data in a network 1714 with an entity that is external to the processing system 1700, such as a network appliance, through any known and/or convenient communications protocol supported by the processing system 1700 and the external entity. The network adapter 1712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. An unmanned aerial vehicle UAV) configured for autonomous flight through a physical environment, the UAV comprising:
- a first image capture device;
- a second image capture device, the second image capture device different than the first image capture device;
- a propulsion system;
- a visual navigation system configured to:
  - process a first plurality of images received from the first image capture device; and
  - generate control commands based at least in part on the first plurality of images received from the first image capture device, the control commands configured to maneuver the UAV using the propulsion system;
- a subject tracking system configured to automatically adjust an orientation of the second image capture device relative to the UAV such that a subject in the physical environment remains in a field of view of the second image capture device while the UAV is in flight; and
- an optical discrepancy detection system configured to:
  - receive, from the first image capture device, a first image of the physical environment from a first position;
  - receive, from the second image capture device, a second image of the physical environment from a second position;
  - process the first image and the second image to compare photometric characteristics of pixels in the first image and the second image corresponding to a common point of reference in the physical environment; and
  - detect an optical discrepancy associated with the capture of the first image and/or the second image based on the processing.

2. The UAV of claim 1, wherein the first image capture device includes an array of stereoscopic cameras arranged along a perimeter of the UAV so as to provide a stereoscopic view at a plurality of angles around the UAV.

3. The UAV of claim 1, wherein the subject tracking system includes a hybrid mechanical-digital gimbal system, the hybrid mechanical digital gimbal system including:
- a mechanical gimbal configured to rotate the second image capture device about a first axis relative to the UAV; and
- an image processing system configured to rotate one or more of a second plurality of images captured by the second image capture device about a second axis relative to the UAV.

4. The UAV of claim 1, further comprising:
- an image processing system configured to automatically adjust the first image and/or second image to correct for the detected optical discrepancy.

5. The UAV of claim 1, further comprising:
- a notification system configured to:
  - generate a notification in response to detecting the optical discrepancy; and
  - transmit the notification, via a wireless communication link, to a remote computing device.

6. The UAV of claim 1, wherein the optical discrepancy detection system is further configured to:
- identify a region of the first image and/or second image corresponding to the detected optical discrepancy; and
- apply a mask to the region of the first image and/or second image corresponding to the detected optical discrepancy.

7. The UAV of claim 6, wherein applying the mask to the region of the first image and/or second image causes the visual navigation system to ignore the region of the first image and/or second image when generating control commands to maneuver the UAV.

* * * * *